United States Patent
Lee et al.

(10) Patent No.: US 11,489,608 B2
(45) Date of Patent: Nov. 1, 2022

(54) TRANSMISSION OF SYNCHRONIZATION SIGNALS

(71) Applicant: APPLE INC., Cupertino, CA (US)

(72) Inventors: Dae Won Lee, Portland, OR (US); Gregory Morozov, Nizhny Novgorod (RU); Ansab Ali, Hillsboro, OR (US); Seunghee Han, San Jose, CA (US); Yongjun Kwak, Portland, OR (US)

(73) Assignee: APPLE INC., Cupertino, CA (US)

( * ) Notice: Subject to any disclaimer, the term of this patent is extended or adjusted under 35 U.S.C. 154(b) by 324 days.

(21) Appl. No.: 16/490,884

(22) PCT Filed: Mar. 2, 2018

(86) PCT No.: PCT/US2018/020719
§ 371 (c)(1),
(2) Date: Sep. 3, 2019

(87) PCT Pub. No.: WO2018/161001
PCT Pub. Date: Sep. 7, 2018

(65) Prior Publication Data
US 2020/0014483 A1    Jan. 9, 2020

Related U.S. Application Data

(60) Provisional application No. 62/480,104, filed on Mar. 31, 2017, provisional application No. 62/473,877, (Continued)

(51) Int. Cl.
*H04J 11/00* (2006.01)
*H04J 13/00* (2011.01)
*H04L 27/26* (2006.01)

(52) U.S. Cl.
CPC ....... *H04J 11/0073* (2013.01); *H04J 13/0025* (2013.01); *H04L 27/2607* (2013.01); (Continued)

(58) Field of Classification Search
None
See application file for complete search history.

(56) References Cited

U.S. PATENT DOCUMENTS

2008/0273522 A1* 11/2008 Luo ..................... H04J 13/102
                                                                  370/350
2010/0123598 A1*  5/2010 Brodersen ............. G08C 19/28
                                                                  340/12.19

(Continued)

FOREIGN PATENT DOCUMENTS

CN       102870387 A      1/2013
WO       2008149323 A2   12/2008
WO    WO 2017/058427    *  4/2017

OTHER PUBLICATIONS

Huawei, Hisilicon, "Synchronization Signals for NR", R1-1703352, 3GPP TSG RAN WG1 Meeting #88, Athens, Greece, Agenda Item 8.1.1.1.5, Feb. 13-17, 2017, 13 pages.

(Continued)

*Primary Examiner* — Christopher T Wyllie

(57) ABSTRACT

Technology for a Next Generation NodeB (gNB) operable to encode a primary synchronization signal for transmission to a user equipment (UE) is disclosed. The gNB can identify a sequence d(n) for a primary synchronization signal. The sequence d(n) can be defined by: d(5 n)=1.2s(n), where s(n) is a maximum run length sequence (msequence) and s(n) is provided as s(n+7)=(s(n +4)+s(n)) mod 2, where 0.n.127. The gNB can generate the primary synchronization signal based on the sequence d(n). The gNB can encode the primary synchronization signal for transmission to the UE.

18 Claims, 30 Drawing Sheets

Related U.S. Application Data filed on Mar. 20, 2017, provisional application No. 62/469,397, filed on Mar. 9, 2017, provisional application No. 62/467,637, filed on Mar. 6, 2017, provisional application No. 62/466,877, filed on Mar. 3, 2017.

(52) U.S. Cl.
CPC ...... *H04L 27/2613* (2013.01); *H04L 27/2614* (2013.01); *H04L 27/2692* (2013.01); *H04L 27/2636* (2013.01); *H04L 27/26136* (2021.01)

(56) References Cited

U.S. PATENT DOCUMENTS

| | | | |
|---|---|---|---|
| 2013/0176991 A1* | 7/2013 | Yi ...................... | H04L 27/2684 370/336 |
| 2016/0254889 A1 | 9/2016 | Shattil | |
| 2017/0373900 A1* | 12/2017 | Adhikary ............ | H04L 27/2613 |
| 2019/0028224 A1* | 1/2019 | Kim .................... | H04L 27/2613 |
| 2019/0029040 A1* | 1/2019 | Sun .................... | H04W 72/0446 |
| 2019/0182365 A1* | 6/2019 | Li ...................... | H04L 27/2075 |
| 2020/0014483 A1* | 1/2020 | Lee .................... | H04J 13/0025 |
| 2020/0295896 A1* | 9/2020 | Xiong ................ | H04L 27/2636 |
| 2020/0412590 A1* | 12/2020 | Akkarakaran ...... | H04L 27/2613 |

OTHER PUBLICATIONS

R1-1702180; 3GPP TSG RAN WG1 Meeting RAN1 #88; Title: Synchronization Signal Sequence Design; Agenda Item: 8.1.1.1.5; Source: Intel Corporation; Athens, Greece; Feb. 13-17, 2017.

R1-1701059; 3GPP TSG RAN WG1 NR AH meeting; Title: Synchronization Signal Design and Performance Analysis: Agenda Item: 5.1.1.1.4; Source: Nokia; Spokane, WA, USA; Jan. 16-20, 2017.

R1-1706189; 3GPP TSG RAN WG1 Meeting #88bis; Title: Synchronization Signal Design and Performance Analysis: Agenda Item: 8.1.1.1.1; Source: Nokia; Spokane, WA, USA; Apr. 3-7, 2017.

Intel Corporation, et al.,"Design of D2D Synchronization Signal (D2DSS), R1-142874, 3GPP TSG RAN WG1 Meeting #78, Dresden, Germany, Agenda Item 7.2.3.3.2", Aug. 18-24, 2014, 13 pages.

Intel Corporation, et al.,"NR PSS and SSS Design, R1-1704707, 3GPP TSG RAN WG1 Meeting RAN1 #88bis, Spokane, Washington, Agenda Item 8.1.1.1.1", Apr. 3-7, 2017, 23 pages.

\* cited by examiner

| Length 63 M-sequence | Length 128 M-sequence | Length 255 M-sequence |
|---|---|---|
| $x^6 + x^1 + 1$ | $x^7 + x^1 + 1$ | $x^8 + x^4 + x^3 + x^2 + 1$ |
| $x^6 + x^4 + x^3 + x^1 + 1$ | $x^7 + x^3 + 1$ | $x^8 + x^5 + x^3 + x^2 + 1$ |
| $x^6 + x^5 + 1$ | $x^7 + x^3 + x^2 + x^1 + 1$ | $x^8 + x^5 + x^3 + x^1 + 1$ |
| $x^6 + x^5 + x^2 + x^1 + 1$ | $x^7 + x^4 + x^3 + x^2 + 1$ | $x^8 + x^6 + x^3 + x^2 + 1$ |
| $x^6 + x^5 + x^3 + x^2 + 1$ | $x^7 + x^4 + 1$ | $x^8 + x^6 + x^4 + x^3 + x^2 + x^1 + 1$ |
| $x^6 + x^5 + x^4 + x^1 + 1$ | $x^7 + x^5 + x^3 + x^1 + 1$ | $x^8 + x^6 + x^5 + x^1 + 1$ |
|  | $x^7 + x^5 + x^2 + x^1 + 1$ | $x^8 + x^6 + x^5 + x^2 + 1$ |
|  | $x^7 + x^5 + x^3 + x^2 + 1$ | $x^8 + x^6 + x^5 + x^3 + 1$ |
|  | $x^7 + x^5 + x^4 + x^3 + 1$ | $x^8 + x^6 + x^5 + x^4 + 1$ |
|  | $x^7 + x^5 + x^4 + x^3 + x^2 + x^1 + 1$ | $x^8 + x^7 + x^2 + x^1 + 1$ |
|  | $x^7 + x^6 + 1$ | $x^8 + x^7 + x^3 + x^2 + 1$ |
|  | $x^7 + x^6 + x^3 + x^1 + 1$ | $x^8 + x^7 + x^5 + x^3 + 1$ |
|  | $x^7 + x^6 + x^4 + x^2 + 1$ | $x^8 + x^7 + x^6 + x^1 + x^2 + x^1 + 1$ |
|  | $x^7 + x^6 + x^4 + x^1 + 1$ | $x^8 + x^7 + x^6 + x^3 + x^2 + x^1 + 1$ |
|  | $x^7 + x^6 + x^5 + x^2 + 1$ | $x^8 + x^7 + x^6 + x^5 + x^2 + x^1 + 1$ |
|  | $x^7 + x^6 + x^5 + x^3 + x^2 + x^1 + 1$ | $x^8 + x^7 + x^6 + x^5 + x^4 + x^2 + 1$ |
|  | $x^7 + x^6 + x^5 + x^4 + 1$ |  |
|  | $x^7 + x^6 + x^5 + x^4 + x^2 + x^1 + 1$ |  |

FIG. 2

| Primitive Polynomial | PAPR [dB] | CM [dB] |
|---|---|---|
| x^7+x^1+1 | 5.4273 | 1.1929 |
| x^7+x^3+1 | 4.8186 | 1.0908 |
| x^7+x^3+x^2+x^1+1 | 4.8296 | 1.2546 |
| x^7+x^4+1 | 5.8473 | 1.4151 |
| x^7+x^4+x^3+x^2+1 | 5.4245 | 1.2278 |
| x^7+x^5+x^2+x^1+1 | 5.6957 | 1.6669 |
| x^7+x^5+x^3+x^1+1 | 6.2735 | 1.4334 |
| x^7+x^5+x^4+x^3+1 | 5.7283 | 1.1026 |
| x^7+x^5+x^4+x^3+x^2+x^1+1 | 4.9338 | 1.1115 |
| x^7+x^6+1 | 6.0214 | 1.2626 |
| x^7+x^6+x^3+x^1+1 | 4.7381 | 1.2379 |
| x^7+x^6+x^4+x^1+1 | 5.684 | 1.0969 |
| x^7+x^6+x^4+x^2+1 | 6.1991 | 1.5642 |
| x^7+x^6+x^5+x^2+1 | 5.7609 | 1.2545 |
| x^7+x^6+x^5+x^3+x^2+x^1+1 | 5.5639 | 1.3282 |
| x^7+x^6+x^5+x^4+1 | 5.5522 | 1.4292 |
| x^7+x^6+x^5+x^4+x^2+x^1+1 | 6.498 | 1.2047 |
| x^7+x^6+x^5+x^4+x^3+x^2+1 | 4.9603 | 1.0801 |

FIG. 7

| Primitive Polynomial | PAPR [dB] | CM [dB] |
|---|---|---|
| x^8+x^4+x^3+x^2+1 | 6.0255 | 1.5268 |
| x^8+x^5+x^3+x^1+1 | 5.246 | 1.1329 |
| x^8+x^5+x^3+x^2+1 | 5.3303 | 1.2112 |
| x^8+x^6+x^3+x^2+1 | 5.9848 | 1.1009 |
| x^8+x^6+x^4+x^3+x^2+x^1+1 | 6.4162 | 1.3735 |
| x^8+x^6+x^5+x^1+1 | 5.6207 | 1.4487 |
| x^8+x^6+x^5+x^2+1 | 5.5156 | 1.4034 |
| x^8+x^6+x^5+x^3+1 | 7.1695 | 1.609 |
| x^8+x^6+x^5+x^4+1 | 7.2651 | 1.5649 |
| x^8+x^7+x^2+x^1+1 | 6.0806 | 1.1581 |
| x^8+x^7+x^3+x^2+1 | 6.2085 | 1.2081 |
| x^8+x^7+x^5+x^3+1 | 5.7949 | 1.0685 |
| x^8+x^7+x^6+x^1+1 | 5.5303 | 1.1117 |
| x^8+x^7+x^6+x^3+x^2+x^1+1 | 5.9109 | 1.33 |
| x^8+x^7+x^6+x^5+x^2+x^1+1 | 4.9352 | 1.1901 |
| x^8+x^7+x^6+x^5+x^4+x^2+1 | 5.8552 | 1.2338 |

FIG. 8

| Primitive Polynomial | PAPR [dB] | CM [dB] |
|---|---|---|
| x^7+x^1+1 | 6.8102 | 2.63 |
| x^7+x^3+1 | 7.1645 | 2.7035 |
| x^7+x^3+x^2+x^1+1 | 7.1729 | 2.6946 |
| x^7+x^4+1 | 7.1257 | 2.6251 |
| x^7+x^4+x^3+x^2+1 | 7.0611 | 2.5091 |
| x^7+x^5+x^2+x^1+1 | 6.7406 | 2.6859 |
| x^7+x^5+x^3+x^1+1 | 7.2535 | 2.6356 |
| x^7+x^5+x^4+x^3+1 | 7.0112 | 2.5144 |
| x^7+x^5+x^4+x^3+x^2+x^1+1 | 7.825 | 2.7236 |
| x^7+x^6+1 | 6.7627 | 2.5023 |
| x^7+x^6+x^3+x^1+1 | 6.8907 | 2.7918 |
| x^7+x^6+x^4+x^1+1 | 6.9012 | 2.6966 |
| x^7+x^6+x^4+x^2+1 | 7.2721 | 2.498 |
| x^7+x^6+x^5+x^2+1 | 6.7408 | 2.5906 |
| x^7+x^6+x^5+x^3+x^2+x^1+1 | 7.6261 | 2.969 |
| x^7+x^6+x^5+x^4+1 | 7.1589 | 2.5124 |
| x^7+x^6+x^5+x^4+x^2+x^1+1 | 7.8232 | 2.8758 |
| x^7+x^6+x^5+x^4+x^3+x^2+1 | 7.8067 | 2.6333 |

FIG. 9

| Primitive Polynomial | PAPR [dB] | CM [dB] |
|---|---|---|
| x^8+x^4+x^3+x^2+1 | 6.9334 | 2.5775 |
| x^8+x^5+x^3+x^1+1 | 6.842 | 2.6543 |
| x^8+x^5+x^3+x^2+1 | 7.5117 | 2.6541 |
| x^8+x^6+x^3+x^2+1 | 7.2033 | 2.6009 |
| x^8+x^6+x^4+x^3+x^2+x^1+1 | 8.6377 | 2.8753 |
| x^8+x^6+x^5+x^1+1 | 7.5482 | 2.7273 |
| x^8+x^6+x^5+x^2+1 | 7.388 | 2.6202 |
| x^8+x^6+x^5+x^3+1 | 7.5129 | 2.7344 |
| x^8+x^6+x^5+x^4+1 | 6.9246 | 2.6195 |
| x^8+x^7+x^2+x^1+1 | 7.1576 | 2.8626 |
| x^8+x^7+x^3+x^2+1 | 7.4111 | 2.6225 |
| x^8+x^7+x^5+x^3+1 | 6.8533 | 2.5985 |
| x^8+x^7+x^6+x^1+1 | 7.2244 | 2.7934 |
| x^8+x^7+x^6+x^3+x^2+x^1+1 | 8.0282 | 2.731 |
| x^8+x^7+x^6+x^5+x^2+x^1+1 | 8.2561 | 2.7585 |
| x^8+x^7+x^6+x^5+x^4+x^2+1 | 7.5677 | 2.8866 |

FIG. 10

| Primitive Polynomial | PAPR [dB] | CM [dB] |
|---|---|---|
| x^7+x^1+1 | 4.341 | 0.2139 |
| x^7+x^3+1 | 4.1881 | 0.2214 |
| x^7+x^3+x^2+x^1+1 | 4.5565 | 0.2643 |
| x^7+x^4+1 | 4.1738 | 0.1802 |
| x^7+x^4+x^3+x^2+1 | 4.1364 | 0.2152 |
| x^7+x^5+x^2+x^1+1 | 4.0419 | 0.2796 |
| x^7+x^5+x^3+x^1+1 | 4.2098 | 0.2129 |
| x^7+x^5+x^4+x^3+1 | 4.9064 | 0.3459 |
| x^7+x^5+x^4+x^3+x^2+x^1+1 | 4.7821 | 0.2865 |
| x^7+x^6+1 | 5.7213 | 0.2621 |
| x^7+x^6+x^3+x^1+1 | 4.1547 | 0.2365 |
| x^7+x^6+x^4+x^1+1 | 3.9658 | 0.2436 |
| x^7+x^6+x^4+x^2+1 | 5.2862 | 0.2119 |
| x^7+x^6+x^5+x^2+1 | 4.4196 | 0.1768 |
| x^7+x^6+x^5+x^3+x^2+x^1+1 | 4.6038 | 0.3164 |
| x^7+x^6+x^5+x^4+1 | 5.0177 | 0.279 |
| x^7+x^6+x^5+x^4+x^2+x^1+1 | 4.8262 | 0.3 |
| x^7+x^6+x^5+x^4+x^3+x^2+1 | 5.1549 | 0.2638 |

FIG. 13

| Primitive Polynomial | PAPR [dB] | CM [dB] |
|---|---|---|
| x^8+x^4+x^3+x^2+1 | 4.4023 | 0.2359 |
| x^8+x^5+x^3+x^1+1 | 5.2656 | 0.2553 |
| x^8+x^5+x^3+x^2+1 | 4.977 | 0.219 |
| x^8+x^6+x^3+x^2+1 | 4.3236 | 0.2283 |
| x^8+x^6+x^4+x^3+x^2+x^1+1 | 5.7062 | 0.3198 |
| x^8+x^6+x^5+x^1+1 | 4.6217 | 0.2253 |
| x^8+x^6+x^5+x^2+1 | 4.3619 | 0.2112 |
| x^8+x^6+x^5+x^3+1 | 5.05 | 0.2971 |
| x^8+x^6+x^5+x^4+1 | 4.3789 | 0.1995 |
| x^8+x^7+x^2+x^1+1 | 4.2113 | 0.2881 |
| x^8+x^7+x^3+x^2+1 | 4.4196 | 0.194 |
| x^8+x^7+x^5+x^3+1 | 5.3228 | 0.3042 |
| x^8+x^7+x^6+x^1+1 | 4.3163 | 0.2385 |
| x^8+x^7+x^6+x^3+x^2+x^1+1 | 5.0852 | 0.2509 |
| x^8+x^7+x^6+x^5+x^2+x^1+1 | 5.3053 | 0.2839 |
| x^8+x^7+x^6+x^5+x^4+x^2+1 | 5.0739 | 0.3028 |

FIG. 14

TRANSMISSION OF SYNCHRONIZATION SIGNALS

BACKGROUND

Wireless systems typically include multiple User Equipment (UE) devices communicatively coupled to one or more Base Stations (BS). The one or more BSs may be Long Term Evolved (LTE) evolved NodeBs (eNB) or New Radio (NR) next generation NodeBs (gNB) that can be communicatively coupled to one or more UEs by a Third-Generation Partnership Project (3GPP) network.

Next generation wireless communication systems are expected to be a unified network/system that is targeted to meet vastly different and sometimes conflicting performance dimensions and services. New Radio Access Technology (RAT) is expected to support a broad range of use cases including Enhanced Mobile Broadband (eMBB), Massive Machine Type Communication (mMTC), Mission Critical Machine Type Communication (uMTC), and similar service types operating in frequency ranges up to 100 GHz.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 2 is a table of primitive polynomials for a maximum run length sequence (m-sequence) of length 63, 127 and 255 in accordance with an example;

FIG. 7 is a table illustrating a peak-to-average power ratio (PAPR) and cubic metric (CM) for m-sequences of length 127 that are mapped in a frequency domain in accordance with an example;

FIG. 8 is a table illustrating a PAPR and CM for m-sequences of length 255 that are mapped in a frequency domain in accordance with an example;

FIG. 9 is a table illustrating a PAPR and CM for m-sequences of length 127 that are mapped in a frequency domain in accordance with an example;

FIG. 10 is a table illustrating a PAPR and CM for m-sequences of length 255 that are mapped in a frequency domain in accordance with an example;

FIG. 13 is a table illustrating a PAPR and CM for m-sequences of length 127 that are modulated using BPSK and QBPSK and mapped in a time domain in accordance with an example;

FIG. 14 is a table illustrating a PAPR and CM for m-sequences of length 255 that are modulated using BPSK and QBPSK and mapped in a time domain in accordance with an example;

Figure 1:
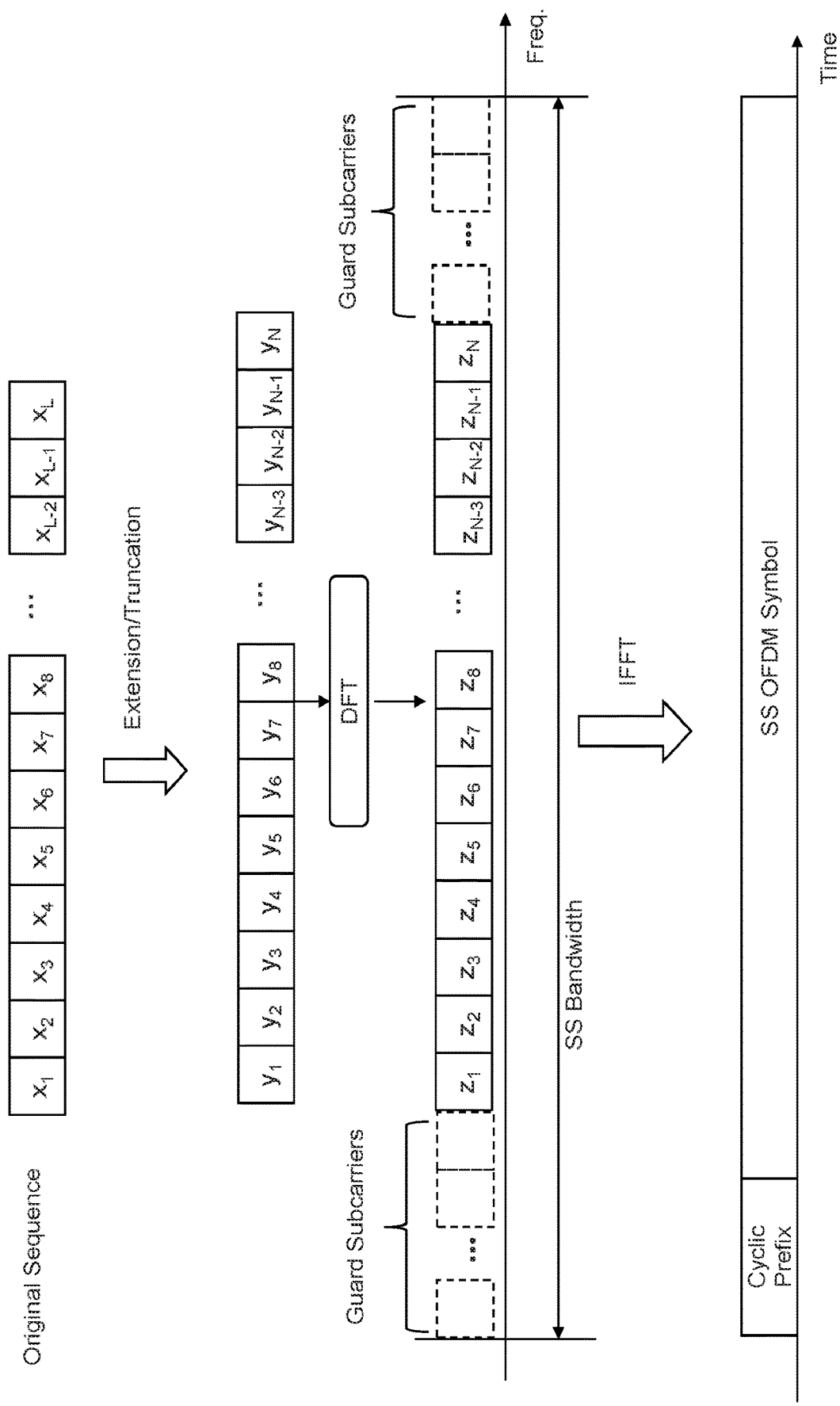
FIG. 1 illustrates a technique for generating a primary synchronization signal in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Definitions

As used herein, the term "User Equipment (UE)" refers to a computing device capable of wireless digital communication such as a smart phone, a tablet computing device, a laptop computer, a multimedia device such as an iPod Touch®, or other type computing device that provides text or voice communication. The term "User Equipment (UE)" may also be referred to as a "mobile device," "wireless device," of "wireless mobile device."

As used herein, the term "Base Station (BS)" includes "Base Transceiver Stations (BTS)," "NodeBs," "evolved NodeBs (eNodeB or eNB)," and/or "next generation NodeBs (gNodeB or gNB)," and refers to a device or configured node of a mobile phone network that communicates wirelessly with UEs.

As used herein, the term "cellular telephone network," "4G cellular," "Long Term Evolved (LTE)," "5G cellular" and/or "New Radio (NR)" refers to wireless broadband technology developed by the Third Generation Partnership Project (3GPP).

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

In the present technology, a novel technique is described for generating time domain modulated binary sequences that can be placed in any frequency bands within a system bandwidth of an OFDM based cellular system. The modulated binary sequence can allow a simple decimator (e.g., down sampler) to be utilized at a receiver (e.g., UE) to reduce a computational complexity for a signal detection algorithm. As a result, a lower complexity detection algorithm can be implemented at the receiver when detect a primary synchronization signal that is transmitted from a transmitter (e.g., gNB).

In one example, to provide a low complex time domain detection algorithm for primary synchronization signals, binary sequences can be generated in the frequency domain with discrete Fourier transform (DFT) precoding.

FIG. 1 illustrates an exemplary technique for generating a primary synchronization signal (PSS). A PSS sequence can be generated using a binary sequence generator. One example of the binary sequence is a maximum run length sequence (m-sequence), which can be generated using a primitive polynomial. The binary sequence can be modulated using binary phase shift keying (BPSK), {+1, −1} and extended (or truncated) to be equal to a DFT length N, where N is a positive integer. In some cases, it can be beneficial for the DFT length N to be a power of 2 (e.g., 64, 128, 256 and so on). The DFT length N being a power of 2 can result in a less complex implementation of the DFT operation. A length N DFT precoded sequence can be mapped to N subcarriers in a frequency domain. An inverse DFT operation (or an inverse fast Fourier transform (IFFT) operation) can be performed over all subcarriers to generate time domain OFDM symbols.

In one example, the generated PSS sequence can be used for frequency and timing detection. The PSS sequence can have certain properties, such as favorable cross-correlation and auto-correlation properties. The favorable cross-correlation and auto-correlation properties can enable a receiver (e.g., UE) to detect the PSS sequence with reduced error as compared to a randomly generated PSS sequence.

As shown in FIG. 1, an original binary sequence (sequence X with length L) can be modulated using BPSK, and then extended or truncated to form a sequence Y (which is equal to the DFT length N). A DFT operation can be performed to map sequence Y (with DFT length N) to N subcarriers in the frequency domain (Z). The frequency domain can include a synchronization signal (SS) bandwidth that includes guard subcarriers. In other words, the DFT operation can be performed on the sequence Y, and those results can be mapped to frequency domain subcarriers of an OFDM system with guard subcarriers. The inverse DFT (or IFFT) operation can be formed on all subcarriers to generate an SS OFDM symbols in the time domain. In addition, a cyclic prefix can be inserted before the SS OFDM symbol in the time domain, which can form the PSS.

In one example, when the binary sequence is generated with an m-sequence, it can be beneficial to perform an extension of the m-sequence to the DFT length N. For example, an m-sequence length can be 63, 127 and 255 when generated with a primitive polynomial order of 6, 7 and 8, respectively. The m-sequence length of 63 can be extended by adding one additional value to create a DFT length of 64. The m-sequence length of 127 can be extended by adding one additional value to create a DFT length of 128. The m-sequence length of 255 can be extended by adding one additional value to create a DFT length of 256.

FIG. 2 is an example of a table of primitive polynomials for an m-sequence of length 63, 127 and 255. The table includes a first list of primitive polynomials for a length 63 m-sequence. The table includes a second list of primitive polynomials for a length 128 m-sequence. The table includes a third list of primitive polynomials for a length 255 m-sequence.

Figure 3:
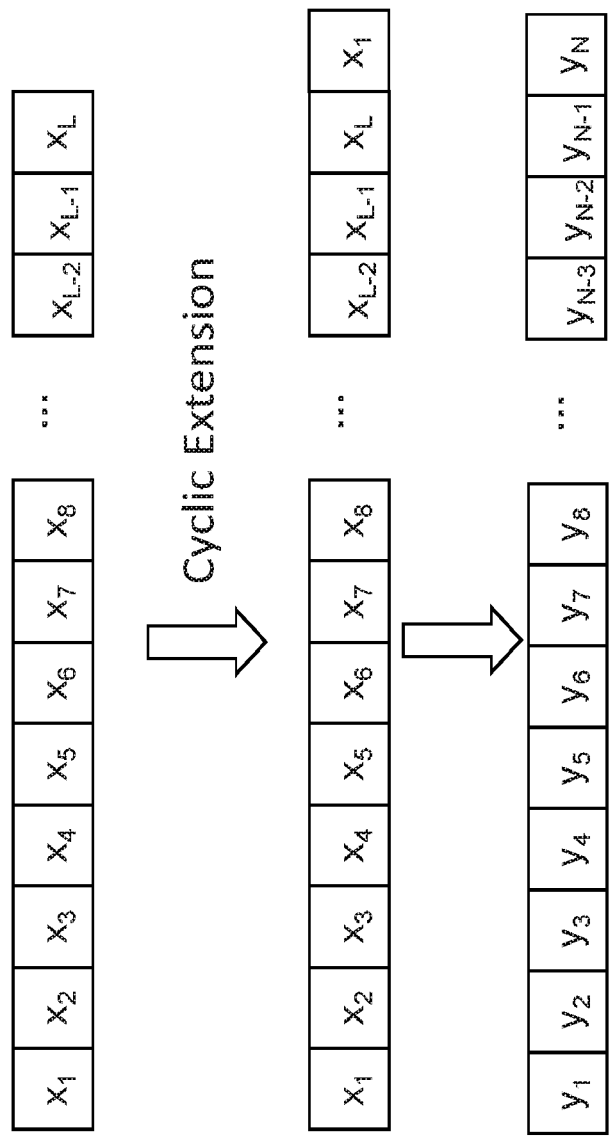
FIG. 3 illustrates a technique for cyclic extension in accordance with an example.

FIG. 3 illustrates an exemplary technique for cyclic extension. The cyclic extension can involve cyclically repeating a sequence (e.g., an m-sequence). For example, a sequence X (of length L) can be cyclically extended by adding another bit (e.g., $X_1$). Then the cyclically extended sequence X can be transformed to a sequence Y (with DFT length N).

Figure 4:
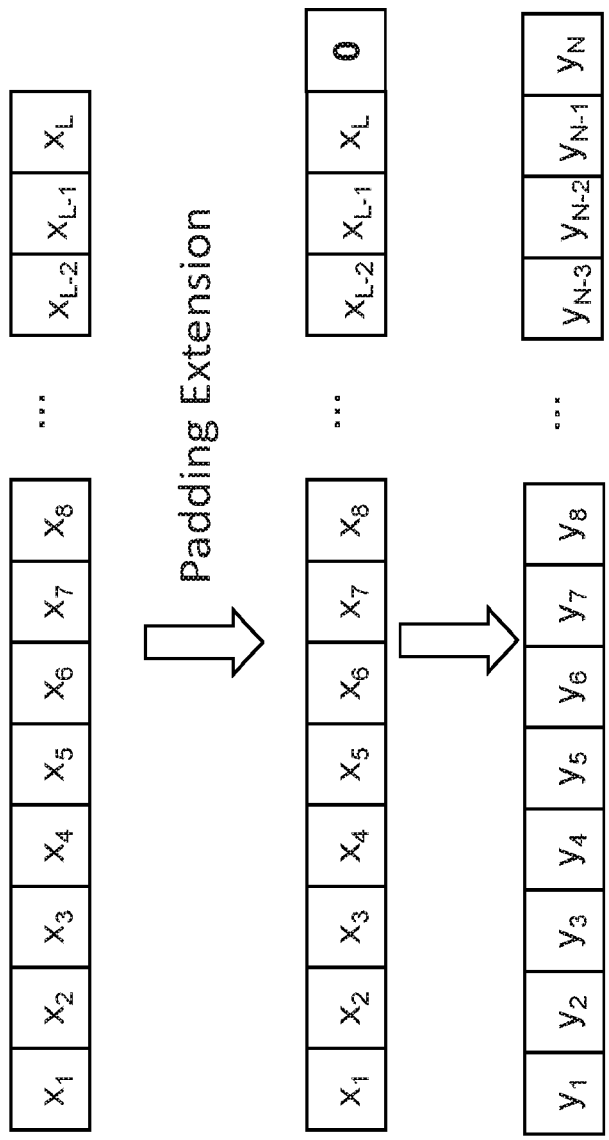
FIG. 4 illustrates a technique for padding extension in accordance with an example.

FIG. 4 illustrates an exemplary technique for padding extension. In this example, a sequence (e.g., an m-sequence) can be extended using signal padding. For example, a sequence X (of length L) can be padded by adding a predefined sequence (e.g., a zero value) to the beginning or end of the sequence X. Then the padded sequence X can be transformed to a sequence Y (with DFT length N).

Figure 5:
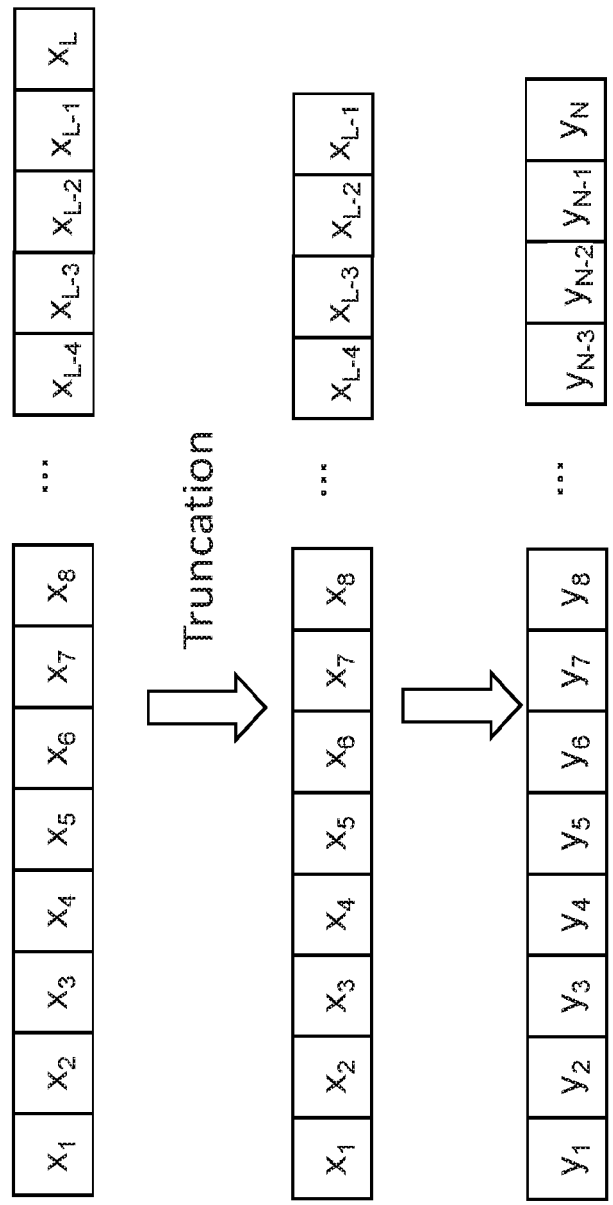
FIG. 5 illustrates a technique for truncation in accordance with an example.

FIG. 5 illustrates an exemplary technique for truncation. The truncation can involve shortening a sequence (e.g., an m-sequence). For example, a sequence X (of length X) can be truncated or shortened by removing a bit from the sequence X (e.g., $X_L$). Then the truncated sequence X can be transformed to a sequence Y (with DFT length N).

In one example, a benefit of the transmission extended modulated binary sequence with DFT precoding is that a simpler cross correlation detection algorithm can be used at the receiver.

Figure 6:
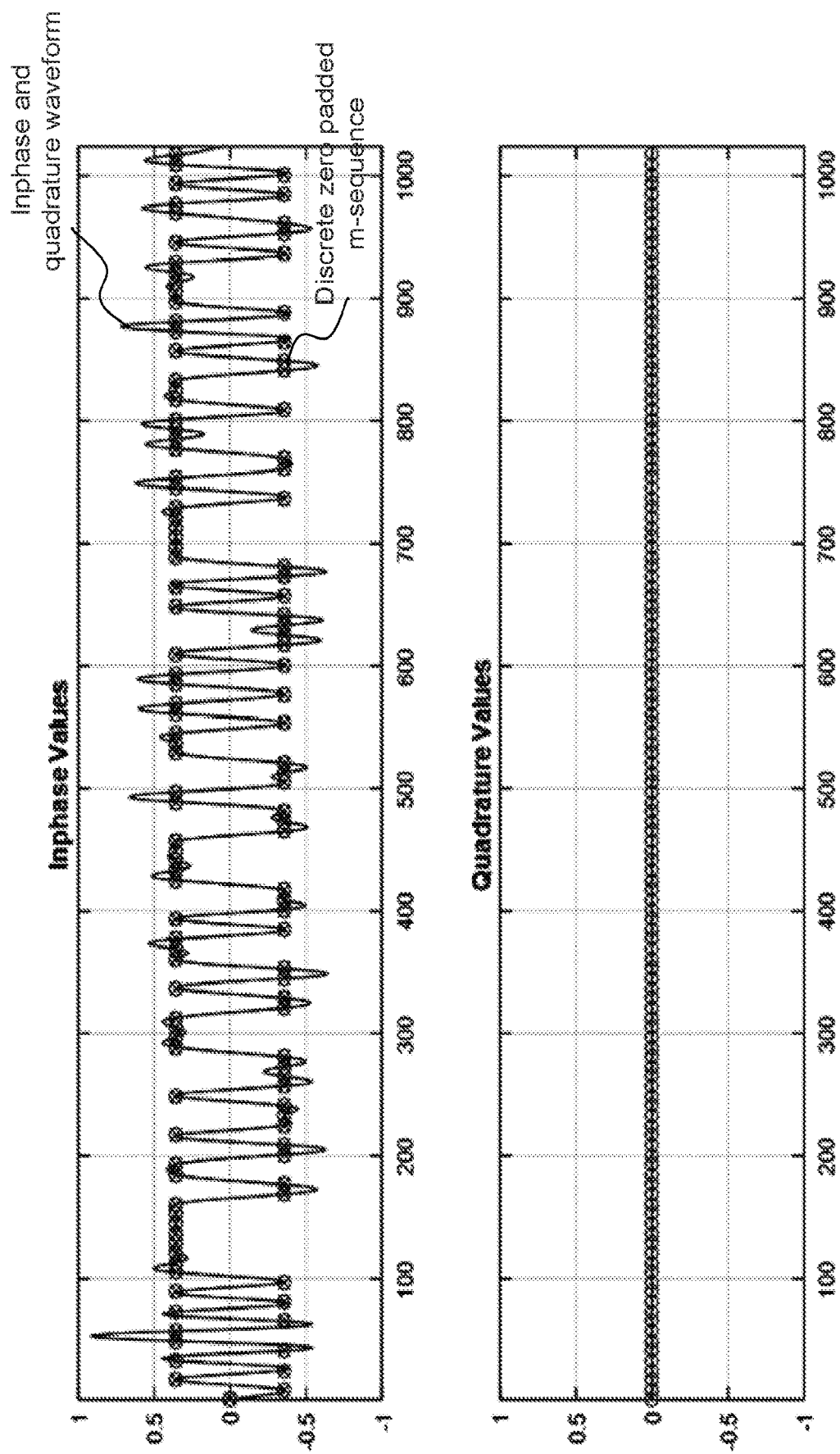
FIG. 6 is a time domain waveform with a binary phase shift keying (BPSK) modulated m-sequence that is discrete Fourier transform (DFT) precoded and mapped in a frequency domain in accordance with an example.

FIG. 6 is an example of a time domain waveform with a BPSK modulated m-sequence that is DFT precoded and mapped in a frequency domain. In this example, the time domain waveform with a BPSK modulated m-sequence length of 127 can be zero padded to create a length 128 sequence, which can be DFT precoded and mapped in the frequency domain. In FIG. 6, an in-phase and quadrature waveform is shown, as well as the discrete zero padded m-sequence.

In one example, at the receiver, cross correlation detection (e.g., matched filter detection) of a signal can be performed using only addition and subtraction, rather than using complex value multiplication, as a reference signal for the cross correlation includes equal amplitude values with sign differences.

In one example, in addition to the benefit of easier receiver implementation, if a transmitted signal has a low peak power to average power ratio (PAPR) or a low cubic metric (CM), in decibels (dB), the signal can be transmitted with a higher transmit power as compared with signals with high PAPR and CM. In general, BPSK modulated m-sequences with DFT precoding can have a higher PAPR and CM as compared to BPSK modulated m-sequences without DFT precoding. The latter case involves mapping BPSK modulated m-sequences into subcarriers in the frequency domain.

FIG. 7 is an exemplary table illustrating a PAPR and CM for m-sequences of length 127 (order 7) that are mapped in a frequency domain. The m-sequences can be generated using a primitive polynomial and modulated with BPSK and mapped directly to the frequency domain (with no DFT operation). In this example, the PAPR and CM results are shown for a length 127 m-sequence.

FIG. 8 is an exemplary table illustrating a PAPR and CM for m-sequences of length 255 (order 8) that are mapped in a frequency domain (with no DFT operation). The m-sequences can be generated using a primitive polynomial and modulated with BPSK and mapped directly to the frequency domain. In this example, the PAPR and CM results are shown for a length 255 m-sequence.

FIG. 9 is an exemplary table illustrating a PAPR and CM for m-sequences of length 127 (order 7) that are mapped in a frequency domain. The m-sequences can be generated using a primitive polynomial, modulated with BPSK, DFT precoded and mapped to the frequency domain. In this example, the PAPR and CM results are shown for a length 127 m-sequence.

FIG. 10 is an exemplary table illustrating a PAPR and CM for m-sequences of length 255 (order 8) that are mapped in a frequency domain. The m-sequences can be generated using a primitive polynomial, modulated with BPSK, DFT precoded and mapped to the frequency domain. In this example, the PAPR and CM results are shown for a length 256 m-sequence.

As indicated in FIGS. 7-10, DFT precoded transmissions of m-sequences typically result in a higher PAPR and CM.

In one configuration, to reduce the PAPR of the signal, a BPSK signal can be modulated with "+1" and "+j" in each even or odd subcarrier, which can be denoted as a binary phase shift keying (BPSK)/quaternary binary phase shift keying (QBPSK) modulation.

Figure 11:
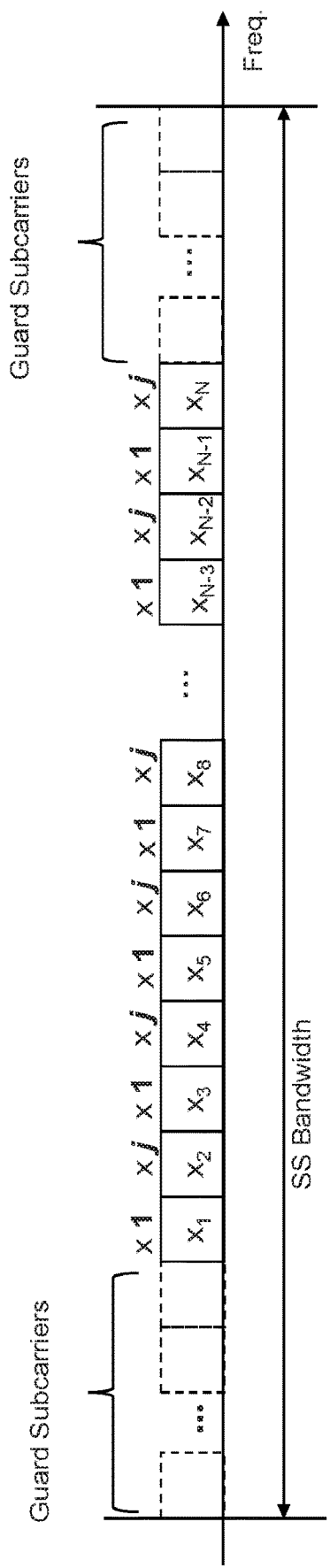
FIG. 11 illustrates a technique for performing binary phase shift keying (BPSK)/quaternary binary phase shift keying (QBPSK) modulation in accordance with an example.

FIG. 11 illustrates an exemplary technique for performing BPSKQBPSK modulation. As shown, a BPSK modulated m-sequence can be multiplied with an alternating sequence of {+1, +j} and mapped to subcarriers in the frequency domain. In this example, the BPSK modulated m-sequence can be interchangeably multiplied by +1 and +j on each even or odd subframe, which can occur prior to DFT and IFFT operations.

Figure 12:
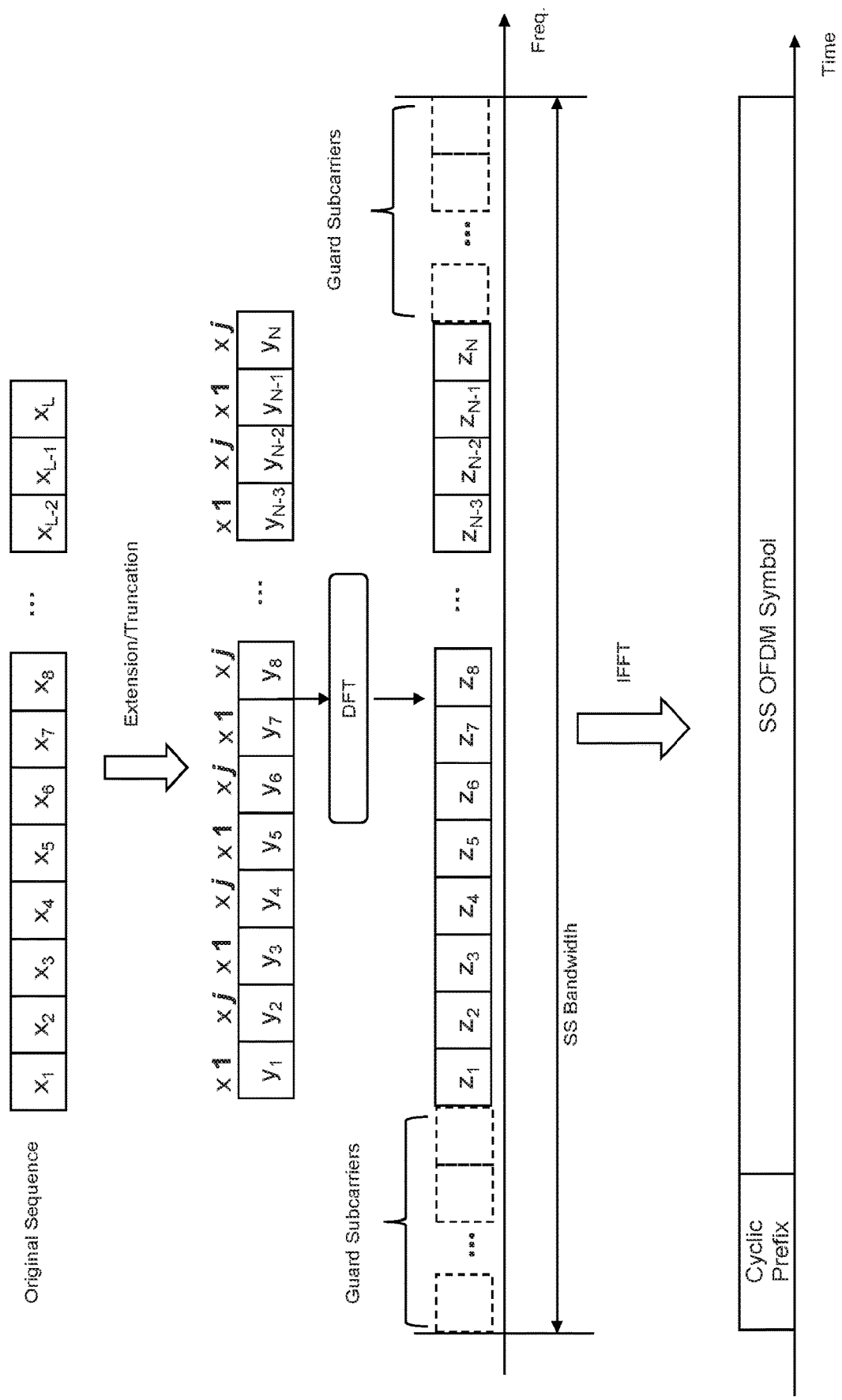
FIG. 12 illustrates a technique for generating a primary synchronization signal that involves performing BPSK/QBPSK modulation in accordance with an example.

FIG. 12 illustrates an exemplary technique for generating a primary synchronization signal that involves performing BPSK/QBPSK modulation. In this example, a BPSK modulated m-sequence can be multiplied with an alternating sequence of {+1, +j}, DFT precoded, and mapped to subcarriers in the frequency domain.

As shown in FIG. 12, a PSS sequence can be generated using a binary sequence generator. One example of the binary sequence is an m-sequence, which can be generated using a primitive polynomial. The binary sequence can be modulated using BPSK, {+1, −1} and extended (or truncated) to form a sequence Y (with DFT length N). The sequence Y can be multiplied with the alternating sequence of {+1, +j}. A DFT operation can be performed to map sequence Y (with DFT length N, and after multiplication of the alternating sequence) to N subcarriers in the frequency domain (Z). In other words, a length N DFT precoded sequence can be mapped to N subcarriers in a frequency domain. The frequency domain can include a SS bandwidth that includes guard subcarriers. In this example, the DFT operation can be performed on the sequence Y, and those results can be mapped to frequency domain subcarriers of an OFDM system with guard subcarriers. An inverse DFT (or IFFT) operation can be formed on all subcarriers to generate an SS OFDM symbol in the time domain. In addition, a cyclic prefix can be inserted before the SS OFDM symbol in the time domain, which can form the PSS.

In one example, the BPSK/QBPSK modulated signal of a DFT precoded m-sequence can result in a reduced PAPR and CM of the transmitted waveform.

FIG. 13 is an exemplary table illustrating a PAPR and CM for m-sequences of length 127 (order 7) that are modulated using BPSK and QBPSK and mapped in a time domain. A DFT precoded m-sequence with zero padding can be modulated with BPSK/QBPSK and mapped in the time domain. In this example, the PAPR and CM results are shown for a length 127 m-sequence.

FIG. 14 is an exemplary table illustrating a PAPR and CM for m-sequences of length 255 (order 8) that are modulated using BPSK and QBPSK and mapped in a time domain. A DFT precoded m-sequence with zero padding can be modulated with BPSK/QBPSK and mapped in the time domain. In this example, the PAPR and CM results are shown for a length 255 m-sequence.

In one example, as shown in FIGS. 13 and 14, the PAPR and CM for m-sequences that are modulated using BPSK and QBPSK and mapped in a time domain can be reduced. The alternating modulation of the BPSK (consisting of {+1, −1} constellation values) and QBPSK (consisting of {+j, −j} constellation values) modulated m-sequence can alter the auto-correlation properties of the m-sequence. An auto-correlation profile of the sequence can impact the detection of the signal, and thus, it is desirable to have a peak at delay 0, and very low values elsewhere.

Figure 15:
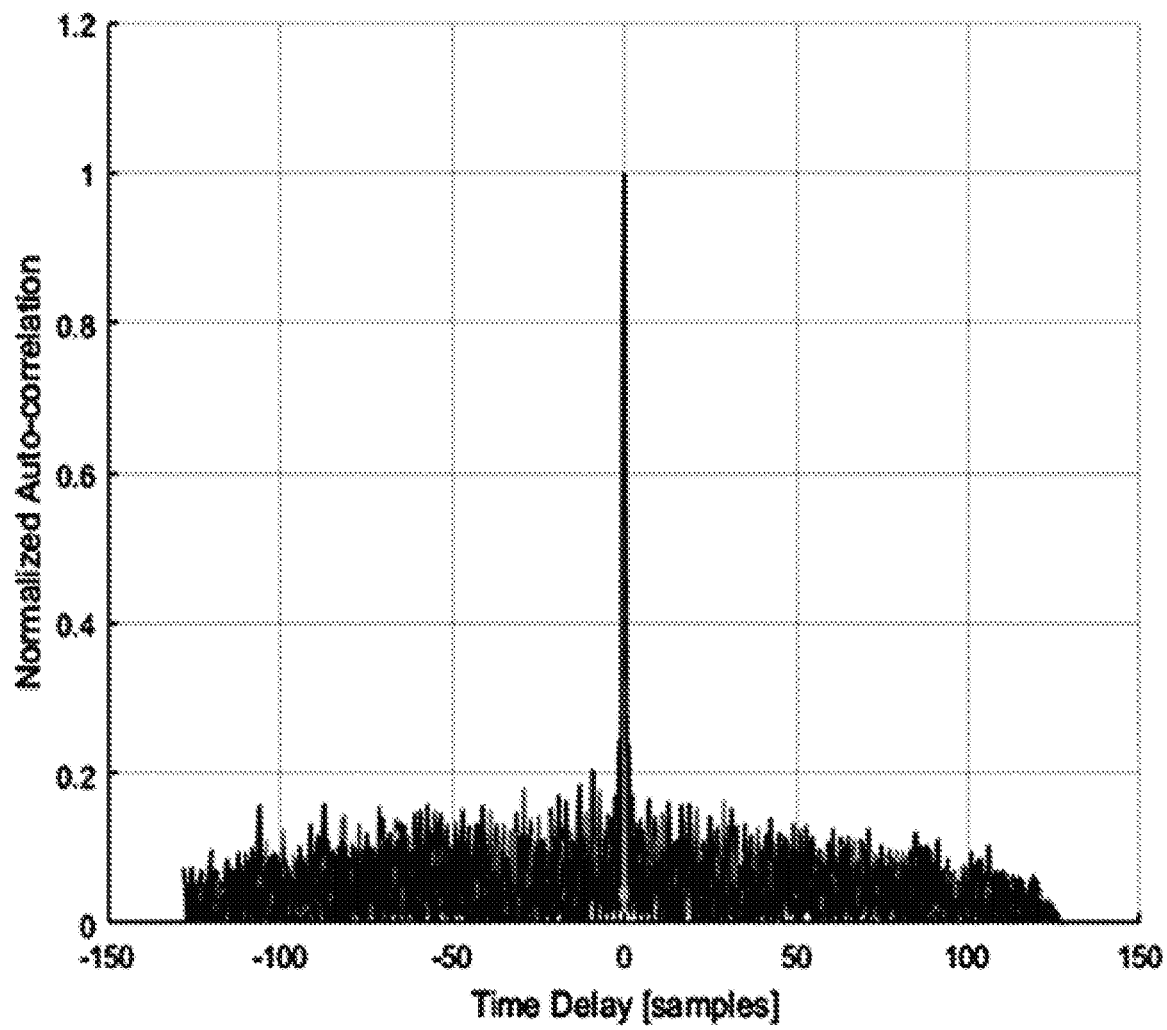
FIG. 15 illustrates an auto-correction profile of an m-sequence of length 127 that is BPSK/QBPSK modulated and DFT precoded in accordance with an example.

FIG. 15 illustrates an exemplary auto-correction profile of an m-sequence of length 127 that is BPSK/QBPSK modulated and DFT precoded. The auto-correlation profile can be represented in terms of a normalized auto-correction and time delay (samples). The auto-correlation profile can have a favorably sharp peak at time delay of 0, and low correlation values elsewhere, similar to a BPSK modulated m-sequence.

In one example, among different m-sequences generated from different primitive polynomials, the auto-correlation profiles can be slightly different. To determine a best performing sequence (i.e., lowest auto-correlation values at time delay other than 0), a cumulative distribution function (CDF) of auto-correlation values can be evaluated. A sequence with a left most CDF curve can have the lowest auto-correlation values other than time delay near 0.

Figure 16:
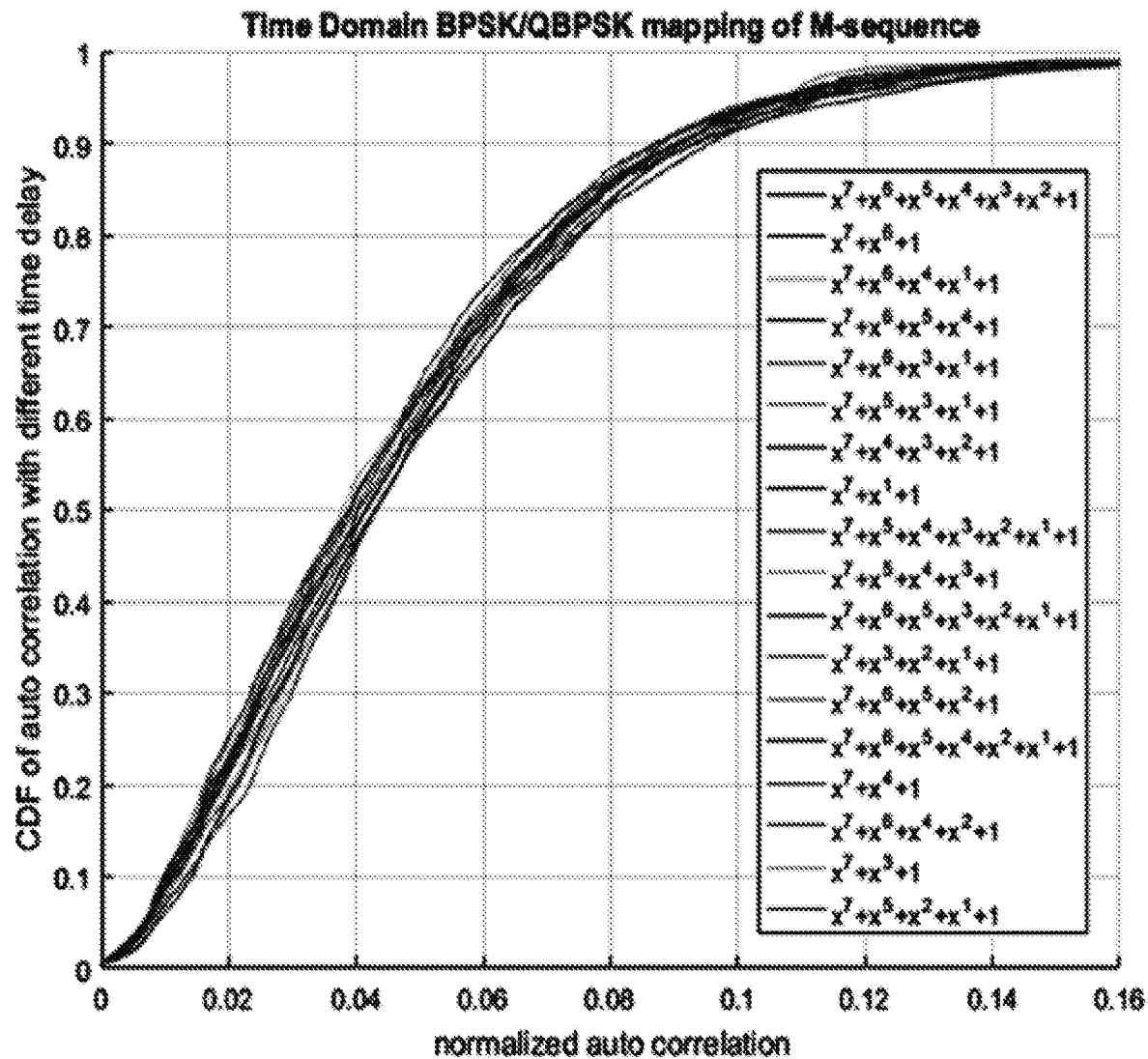
FIG. 16 illustrates a cumulative distribution function (CDF) of auto-correlation values for m-sequences generated with different primitive polynomials that are modulated with BPSK/QBPSK and DFT precoded in accordance with an example.

FIG. 16 illustrates an exemplary CDF of auto-correlation values for m-sequences generated with different primitive polynomials that are modulated with BPSK/QBPSK and DFT precoded. A time domain BPSK/QBPSK mapping of the m-sequences can be represented in terms of the CDF of auto-correlation with different time delays versus a normalized auto-correlation. In this example, the CDF of the auto-correlation values can be for length 127 m-sequences.

Figure 17:
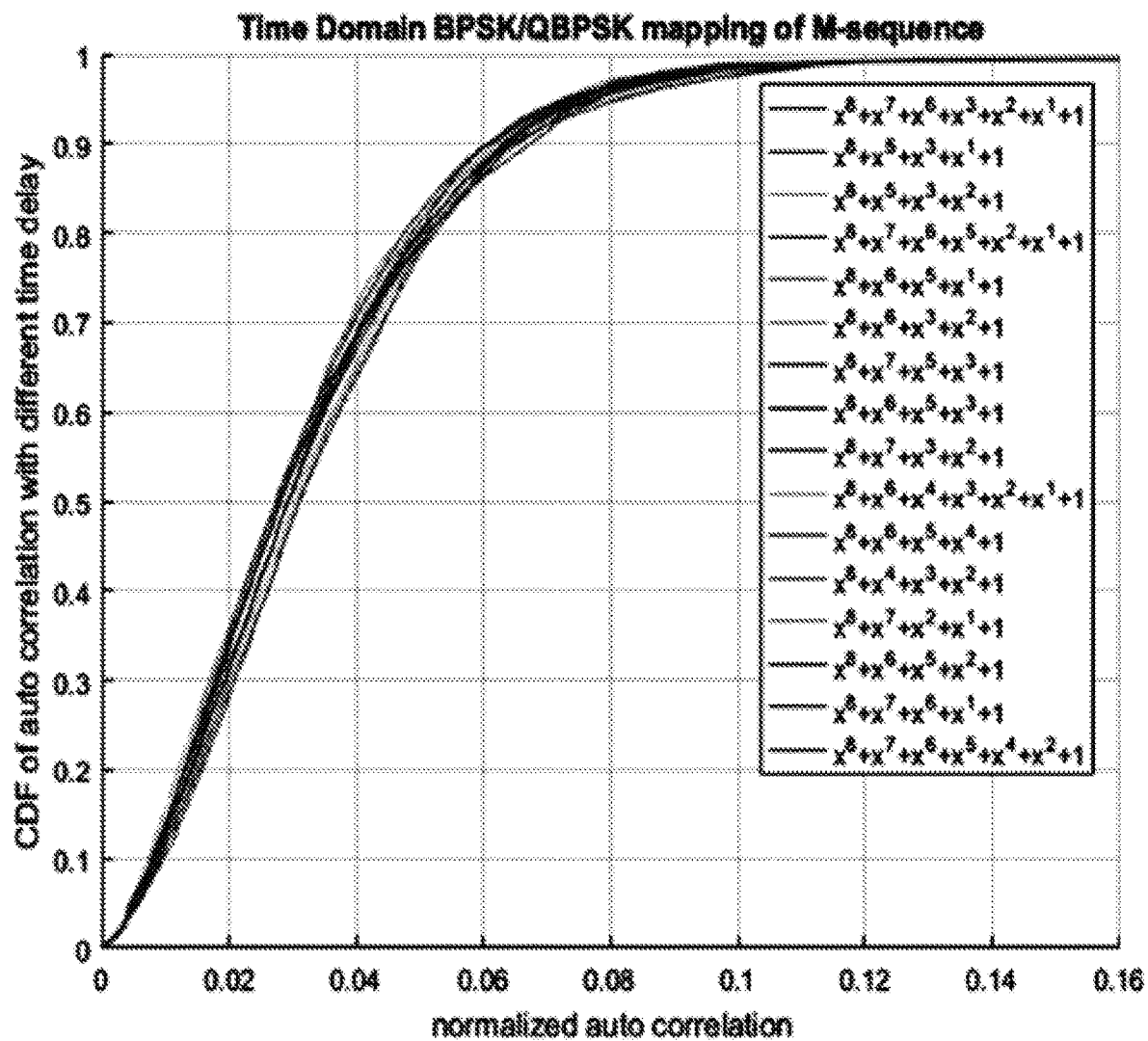
FIG. 17 illustrates a CDF of auto-correlation values for m-sequences generated with different primitive polynomials that are modulated with BPSK/QBPSK and DFT precoded in accordance with an example.

FIG. 17 illustrates an exemplary CDF of auto-correlation values for m-sequences generated with different primitive polynomials that are modulated with BPSK/QBPSK and DFT precoded. A time domain BPSK/QBPSK mapping of the m-sequences can be represented in terms of the CDF of auto-correlation with different time delays versus a normalized auto-correlation. In this example, the CDF of the auto-correlation values can be for length 255 m-sequences.

In FIGS. 16 and 17, the primitive polynomial legends are ordered from the polynomial of m-sequence that has the smallest auto-correlation profile (other than at zero time delay) to the polynomial of m-sequence that has the largest auto-correlation profile.

In one example, an m-sequence generated with $g(x)=x^8+x^7+x^6+x^3+x^2+x^1+1$ provides the best auto-correlation profile while achieving a PAPR and CM of 5.0852 dB and 0.2509 dB, respectively. In another example, an m-sequence generated with $g(x)=x^7+x^6+x^5+x^4+x^3+x^2+1$ provides the best auto-correlation profile while achieving a PAPR and CM of 5.1549 dB and 0.2638 dB. Therefore, the m-sequences generated with the given primitive polynomials are favorable candidates for a PSS that is generated with a BPSK/QBPSK modulated m-sequence with DFT precoding.

In one configuration, an alternative technique is described for generating low PAPR and CM signals (other than alternating BPSK and QBSK modulation prior to DFT precoding). In this alternative technique, a frequency domain ¼ length cyclic shift can be performed to the BPSK modulated m-sequence after DFT precoding. The generated m-sequence can be extended or truncated, modulated with BPSK, DFT precoded, cyclically shifted by quarter of the length of the DFT precoding output, and mapped to frequency subcarriers. The frequency subcarriers can be transformed into a time domain signal by IFFT operation, and a cyclic prefix can be appended to generate an OFDM symbol.

Figure 18:
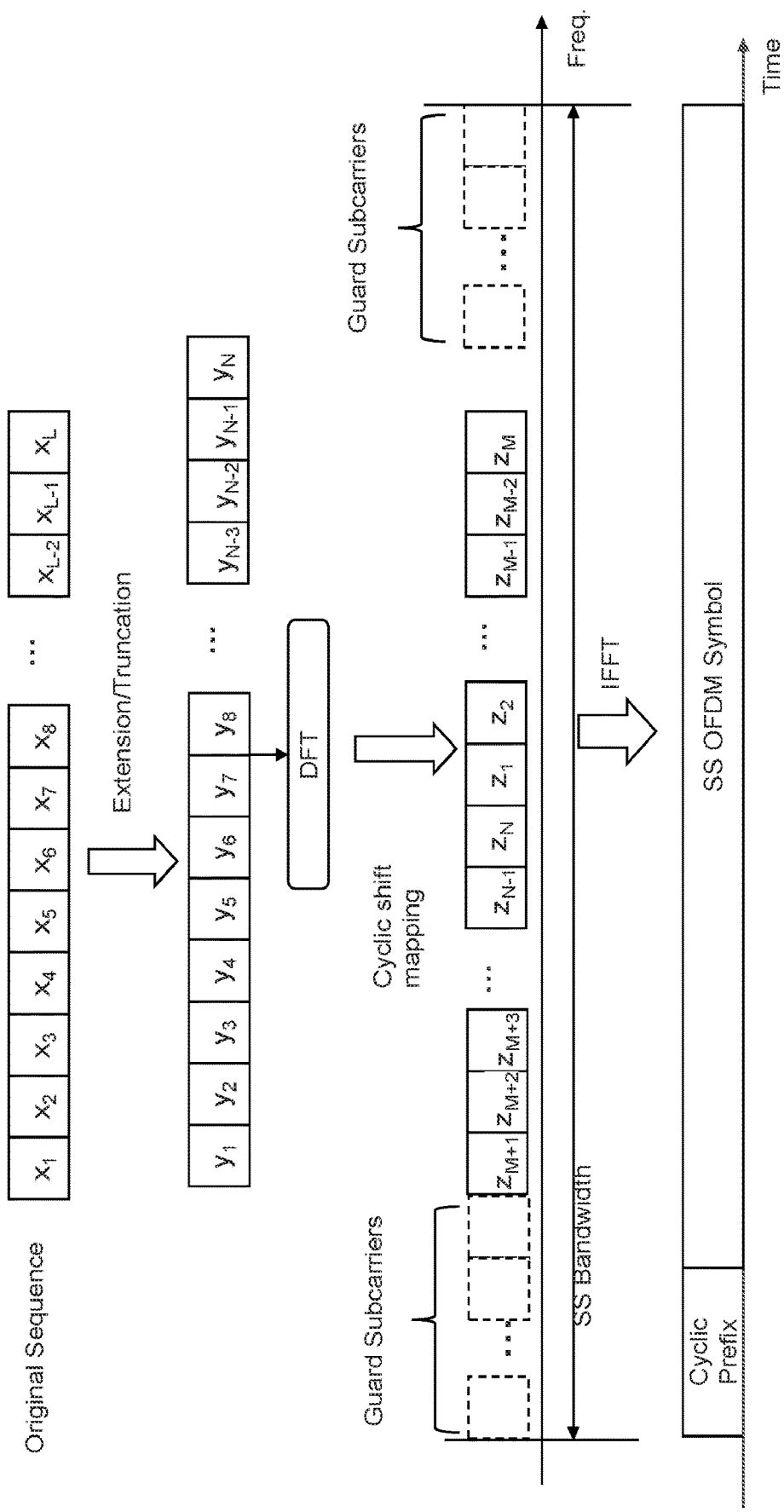
FIG. 18 illustrates a technique for generating a primary synchronization signal that includes cyclic shift mapping in accordance with an example.

FIG. 18 illustrates an exemplary technique for generating a primary synchronization signal that includes cyclic shift mapping. In this example, a PSS sequence can be generated using a binary sequence generator. One example of the binary sequence is an m-sequence, which can be generated using a primitive polynomial. The binary sequence can be modulated using BPSK, {+1, −1} and extended (or truncated) to form a sequence Y (with DFT length N). A DFT operation can be performed on sequence Y (with DFT length N), which can be cyclically shifted by the quarter of the length of the DFT precoding output, and mapped to frequency subcarriers. The sequence Y can be cyclic shift mapped to N subcarriers in the frequency domain (Z). The frequency domain can include a SS bandwidth that includes guard subcarriers. An inverse DFT (or IFFT) operation can be formed on all subcarriers to generate an SS OFDM symbol in the time domain. In addition, a cyclic prefix can be inserted before the SS OFDM symbol in the time domain, which can form the PSS.

In one example, the cyclic shift by quarter of the length of the DFT precoding output (in the frequency domain) can be equivalent to multiplying a linearly phase increasing exponential sequence in the time domain, where the linearly increasing phase amount is π/4 per sample. This creates a time domain sequence that alternates between BPSK modulated samples and QBPSK modulated samples in the time domain, which mimics the alternating BPSK/QBPSK modulation (as shown in FIGS. 11 and 12) with the use of frequency domain cyclic shifts.

In one example, for an m-sequence length of 127, and extended to length 128, a DFT precoded frequency domain signal can be cyclically shifted by 32 positively or negatively. For a length L frequency domain signal, s(n), positively performing a cyclic shift by a quarter can be equal to s ((n+L/4) mod L) and negatively performing cyclic shift by a quarter can be equal to s ((n−L/4)mod L).

Figure 19A:
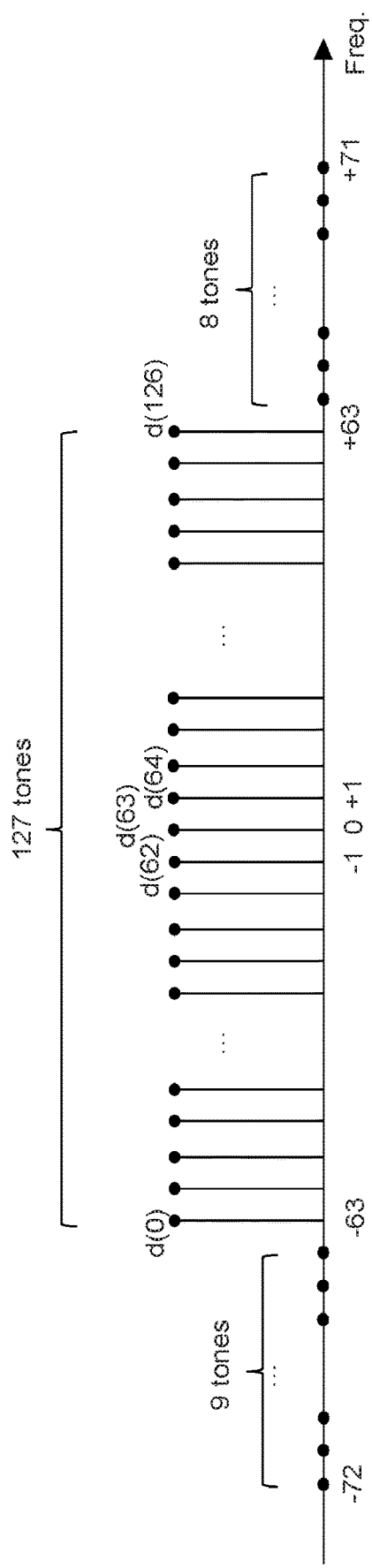
FIG. 19A illustrates sequence generation using an m-sequence of length 127 in accordance with an example.

FIG. 19A illustrates an example of sequence generation using an m-sequence of length 127. The m-sequence of length 127 can be used to generate a sequence that comprises 127 tones (e.g., from d(0) to d(126)). The sequence can be mapped to resource elements (k,l) in the frequency domain. In this example, the sequence can be mapped to 127 tones that correspond to a range of k from −63 to +63, where 9 tones (e.g., ranging from k=−72 to k=−63) and 8 tones (e.g., ranging from k=+63 to k=+71) can be set to zero and surround the sequence.

Figure 19B:
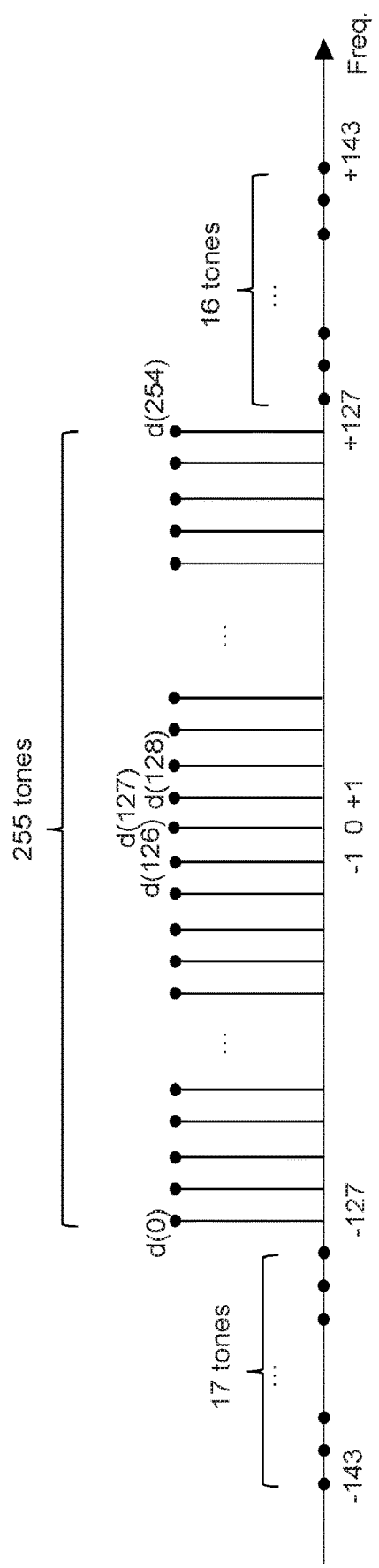
FIG. 19B illustrates sequence generation using an m-sequence of length 255 in accordance with an example.

FIG. 19B illustrates an example of sequence generation using an m-sequence of length 255. The m-sequence of length 255 can be used to generate a sequence that comprises 255 tones (e.g., from d(0) to d(254)). The sequence can be mapped to resource elements (k,l) in the frequency domain. In this example, the sequence can be mapped to 255 tones that correspond to a range of k from −143 to +143, where 17 tones (e.g., ranging from k=−143 to k=−127) and 16 tones (e.g., ranging from k=+127 to k=+143) can be set to zero and surround the sequence.

In one configuration, a length 127 sequence, or m-sequence, which can be represented as s(n), can be generated from a polynomial (e.g., $g(x)=x^7+x+1$ or $g(x)=x^7+x^4+1$) and with an initial state of {0,0,0,0,0,0,1}. The binary m-sequence can be BPSK modulated and mapped to the frequency domain, to form a sequence which can be represented as d(n).

In one example, $d(n)=1-2\cdot s(n)$, n=0, . . . , 126, where s(n) is the m-sequence, and d(n) is a sequence that is derived from the m-sequence that is BPSK modulated and mapped to the frequency domain.

In one example, the sequence s(n) can be a binary sequence that is represented as follows:
{1,0,0,0,0,0,0,1,0,0,0,0,0,1,1,0,0,0,0,1,0,1,0,0,0,1,1,1,1,0,0, 1,0,0,0,1,0,1,1,0,0,1,1,1,1,0,1,0, 1,0,0,1,1,1,1,1,1,0,1,0,0,0,0,1, 1,1,0,0,0,1,0,0,1,0,0,1,1,0,1,1,0,1,0,1,1,0,1,1,1,1,1,0,1,1,0,0,0, 1, 1,0,1,0,0,1,0,1,1,1,0,1,1,1,0,0,1,1,0,0,1,0,1,0,0,1,1,1,1, 1,1}.

In one example, the sequence s(n) formulation can be provided in the following recursive form:
$s(n+7)=(s(n+1)+s(n))\mod 2$, $0 \leq n \leq 126$, where s(0)=1, s(1)=s(2)=s(3)=s(4)=s(5)=s(6)=0.

In another example, the sequence s(n) formulation can be provided in the following recursive form: $s(n+7)=(s(n+4)+s(n)) \mod 2$, where s(0)=1, s(1)=s(2)=s(3)=s(4)=s(5)=s(6)=0.

In one example, a length 255 sequence, or m-sequence, which can be represented as s(n), can be generated from a polynomial $g(x)=x^8+x^4+x^3+x^2+1$ and with initial state of {0,0,0,0,0,0,0,1}. The binary m-sequence can be BPSK modulated and mapped to the frequency domain, to form a sequence which can be represented as d(n).

In one example, $d(n)=1-2\cdot s(n)$, n=0, ..., 255, where s(n) is the m-sequence, and d(n) is a sequence that is derived from the m-sequence that is BPSK modulated and mapped to the frequency domain.

In one example, the sequence s(n) can be a binary sequence that is represented as follows:
{1,0,0,0,0,0,0,0,1,0,0,0,1,1,1,0,0,0,1,0,0,1,0,1,1,1,0,0,0,0,0, 0,1,1,0,0,1,0,0,1,0,0,1,1,0,1,1, 1,0,0,1,0,0,0,0,0,1,0,1,0,1,1, 0,1,1,0,1,0,1,1,0,0,1,0,1,1,0,0,0,0,1,1,1,1,1,0,1,1,0,1,1,1,1,0, 1, 0,1,1,1,0,1,0,0,0,1,0,0,0,0,1,1,0,1,1,0,0,0,1,1,1,1,0,0,1,1, 1,0,0,1,1,0,0,0,1,0,1,1,0,1,0,0,1,0, 0,0,1,0,1,0,0,1,0,1,0,1,0, 0,1,1,1,0,1,1,1,0,1,1,0,0,1,1,1,1,0,1,1,1,1,1,1,0,1,0,0,0,1,1,0,0, 1,1,0, 1,0,1,0,0,0,1,1,0,0,0,0,0,1,1,1,0,1,0,1,0,1,0,1,1,1,1,1, 0,0,1,0,1,0,0,0,0,1,0,0,1,1,1,1,1,1,1,1, 0,0,0,0,1,0,1,1,1,1,0, 0,0,1,1,0}.

In one example, the sequence s(n) formulation can be provided in the following recursive form:
$s(n+8)=(s(n+4)+s(n+3)+s(n+2)+s(n)) \bmod 2$, $0 \le n \le 255$, where $s(0)=1$, $s(1)=s(2)=s(3)=s(4)=s(5)=s(6)=s(7)=0$.

In one configuration, for a length 127 sequence, the sequence d(n) can be mapped to resource elements according to:

$$a_{k,l}=d(n), n=0, \ldots, 126$$

$$k=n-63$$

In one example, the primary synchronization signal can be mapped to symbol 1 of an SS block. Resource elements (k,l) in the OFDM symbols can be used for transmission of the primary synchronization signal, where k=−72, −71, ..., −64, 64, 65, ..., 72 are reserved and not used for transmission of the primary synchronization signal.

In one example, for a length 255 sequence, the sequence d(n) can be mapped to resource elements according to:

$$a_{k,l}=d(n), n=0, \ldots, 254$$

$$k=n-127$$

In one example, the primary synchronization signal can be mapped to symbol/of an SS block. Resource elements (k,l) in the OFDM symbols can be used for transmission of the primary synchronization signal, where k=−143, −142, ..., −128, 128, 129, ..., 143 are reserved and not used for transmission of the primary synchronization signal.

Figure 20:
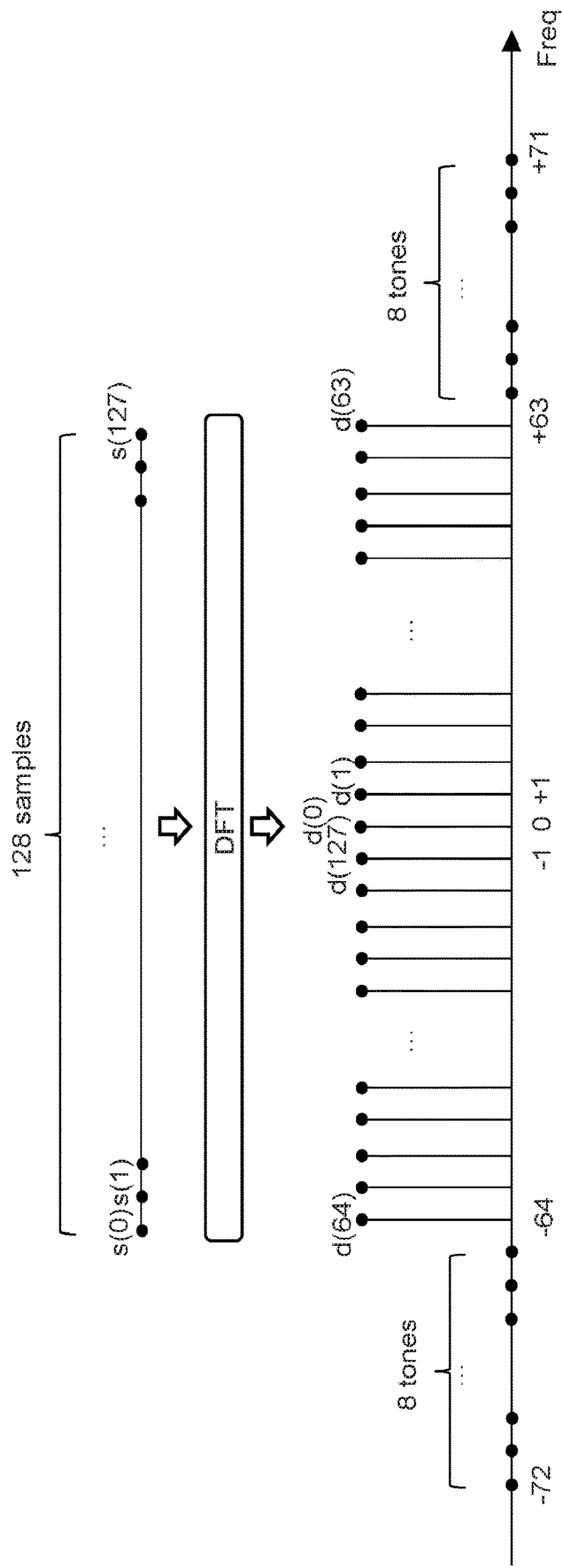
FIG. 20 illustrates sequence generation using an m-sequence of length 128 and DFT precoding in accordance with an example.

FIG. 20 illustrates an example of sequence generation using an m-sequence of length 128 and DFT precoding. The m-sequence of length 128 (i.e., 128 samples) can be represented by s(n). The m-sequence can range from s(0) to s(127). A DFT operation can be performed to map the m-sequence to the frequency domain, and a sequence d(n) can be formed. The sequence d(n) can be mapped to resource elements (k,l) in the frequency domain. In this example, the sequence d(n) can be mapped to 128 samples that correspond to a range of k from −64 to +63, where 8 tones (e.g., ranging from k=−72 to k=−64) and 8 tones (e.g., ranging from k=+63 to k=+71) can be set to zero and surround the sequence d(n).

Figure 21:
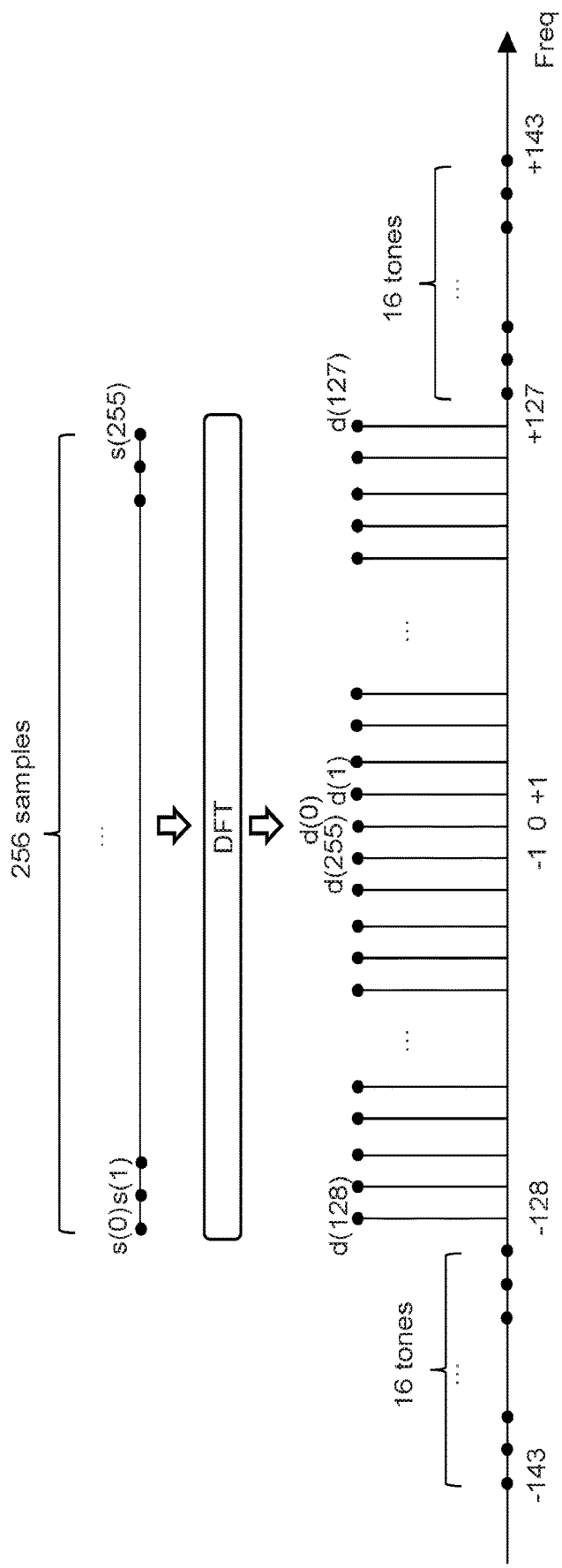
FIG. 21 illustrates sequence generation using an m-sequence of length 256 and DFT precoding in accordance with an example.

FIG. 21 illustrates an example of sequence generation using an m-sequence of length 256 and DFT precoding. The m-sequence of length 256 (i.e., 256 samples) can be represented by s(n). The m-sequence can range from s(0) to s(255). A DFT operation can be performed to map the m-sequence to the frequency domain, and a sequence d(n) can be formed. The sequence d(n) can be mapped to resource elements (k,l) in the frequency domain. In this example, the sequence d(n) can be mapped to 256 samples that correspond to a range of k from −128 to +127, where 16 tones (e.g., ranging from k=−143 to k=−128) and 16 tones (e.g., ranging from k=+127 to k=+143) can be set to zero and surround the sequence d(n).

In one configuration, for a length 127 sequence, or m-sequence, which can be represented as s(n), can be generated from polynomial $g(x)=x^7+x+1$ and with an initial state of {0,0,0,0,0,0,1}. The binary m-sequence can be BPSK modulated, and a zero value can be appended to the length 127 sequence to create a length 128 sequence. The zero appended m-sequence can be DFT precoded and mapped to the frequency domain.

In one example, d(n) is in accordance with the following:

$$\hat{d}(n) = \begin{cases} 0, & n=0 \\ 1-2\cdot s(n-1), & n=1, \Lambda, 127 \end{cases}$$

$$d(n) = \frac{1}{\sqrt{128}} \sum_{k=0}^{127} \hat{d}(k) \exp\left(-j\frac{2\pi k}{128}n\right),$$

where s(n) is the m-sequence, and d(n) is a sequence that is derived from the m-sequence that is BPSK modulated and mapped to the frequency domain. In the above equations, d^(n) represents a time domain waveform of the sequence and d(n) represents a frequency domain waveform of the sequence.

In one example, the sequence s(n) can be a binary sequence that is represented as follows:
{1,0,0,0,0,0,0,1,0,0,0,0,0,1,1,0,0,0,0,1,0,1,0,0,0,1,1,1,1,0,0, 1,0,0,0,1,0,1,1,0,0,1,1,1,0,1,0, 1,0,0,1,1,1,1,1,1,0,1,0,0,0,0,1, 1,1,0,0,0,1,0,0,1,0,0,1,1,0,1,1,0,1,0,1,1,0,1,1,1,1,0,1,1,0,0,0,0, 1, 1,0,1,0,0,1,0,1,1,1,0,1,1,1,1,0,0,1,1,0,0,1,0,1,0,1,0,1,1,1,1, 1,1}

In one example, the sequence s(n) formulation can be provided in the following recursive form:
$s(n+7)=(n+1)+s(n))\bmod 2$, $0 \le n \le 126$, where s(0), $s(1)=s(2)=s(3)=s(4)=s(5)=s(6)=0$.

In one configuration, for a length 255 sequence, or m-sequence, which can be represented as s(n), can be generated from polynomial $g(x)=x^8+x^4+x^3+x^2+1$ and with an initial state of {0,0,0,0,0,0,1}. The binary m-sequence can be BPSK modulated, and a zero value can be appended to the length 255 sequence to create a length 256 sequence. The zero appended m-sequence can be DFT precoded and mapped to the frequency domain.

In one example, d(n) is in accordance with the following:

$$\hat{d}(n) = \begin{cases} 0, & n=0 \\ 1-2\cdot s(n-1), & n=1, \Lambda, 255 \end{cases}$$

$$d(n) = \frac{1}{\sqrt{256}} \sum_{k=0}^{255} \hat{d}(k) \exp\left(-j\frac{2\pi k}{256}n\right),$$

where s(n) is the m-sequence, and d(n) is a sequence that is derived from the m-sequence that is BPSK modulated and mapped to the frequency domain.

In one example, the sequence s(n) can be a binary sequence that is represented as follows:

{1,0,0,0,0,0,0,1,0,0,0,1,1,1,0,0,0,1,0,0,1,0,1,1,1,0,0,0,0,0, 0,1,1,0,0,1,0,0,1,0,0,1,1,0,1,1, 1,0,0,1,0,0,0,0,0,1,0,1,0,1,1, 0,1,1,0,1,0,1,1,0,0,1,0,1,1,0,0,0,0,1,1,1,1,1,0,1,1,0,1,1,1,1,0, 1, 0,1,1,1,0,1,0,0,0,1,0,0,0,0,1,1,0,1,1,0,0,0,1,1,1,1,0,0,1,1, 1,0,0,1,1,0,0,0,0,1,0,1,1,0,1,0,0,1,0, 0,0,1,0,1,0,0,1,0,1,0,1,0, 0,1,1,1,0,1,1,1,0,1,1,0,0,1,1,1,1,0,1,1,1,1,1,1,0,0,1,1,0,0,0, 1,1,0, 1,0,1,0,0,0,1,1,0,0,0,0,0,1,1,1,0,1,0,1,0,1,0,1,1,1,1,1, 0,0,1,0,1,0,0,0,0,0,1,0,0,1,1,1,1,1,1,1,1, 0,0,0,0,1,0,1,1,1,1,0, 0,0,1,1,0}.

In one example, the sequence s(n) formulation can be provided in the following recursive form:
s(n+8)=(s(n+4)+s(n+3)+s(n+2)+s(n))mod2, 0≤n≤255,
where s(0)=₁, s(1)=s(2)=s(3)=s(4)=s(5)=s(6)=s(7)=0.

In one configuration, for a length 127 sequence, the sequence d(n) can be mapped to resource elements ($a_{k,l}$) in accordance with the following:

$a_{k,l}=d(n+64) \mod 128$, $n=0,\ldots,127$ $k=n-64$

In one example, the primary synchronization signal can be mapped to symbol 1 of an SS block. Resource elements (k,l) in the OFDM symbols can be used for transmission of the primary synchronization signal, where k=−72, −71, . . . , −65, 64, 65, . . . , 72 are reserved and not used for transmission of the primary synchronization signal.

In one example, for a length 255 sequence, the sequence d(n) can be mapped to resource elements ($a_{k,l}$) in accordance with the following:

$a_{k,l}=d(n+128) \mod 256$, $n=0,\ldots,255$ $k=n-128$

In one example, the primary synchronization signal can be mapped to symbol 1 of an SS block. Resource elements (k,l) in the OFDM symbols can be used for transmission of the primary synchronization signal, where k=−143, −142, . . . , −129, 128, 129, . . . , 143 are reserved and not used for transmission of the primary synchronization signal.

In one configuration, for a length 127 sequence, the sequence d(n) can be mapped to resource elements ($a_{k,l}$) in accordance with the following:

$a_{k,l}=d(n+64+32) \mod 128$, $n=0,\ldots,127$ $k=n-64$, or $a_{k,l}=d(n+64-32) \mod 128$, $n=0,\ldots,127$ $k=n-64$ In one example, the primary synchronization signal can be mapped to symbol 1 of an SS block. Resource elements (k,l) in the OFDM symbols can be used for transmission of the primary synchronization signal, where k=−72, −71, . . . , −65, 64, 65, . . . , 72 are reserved and not used for transmission of the primary synchronization signal.

In one configuration, for a length 256 sequence, the sequence d(n) can be mapped to resource elements ($a_{k,l}$) in accordance with the following:

$a_{k,l}=d(n+128+64) \mod 250$, $n=0,\ldots,255$ $k=n-128$, or $a_{k,l}=d(n+128-64) \mod 256$, $n=0,\ldots,255$ $k=n-128$ In one example, the primary synchronization signal can be mapped to symbol 1 of an SS block. Resource elements (k, l) in the OFDM symbols can be used for transmission of the primary synchronization signal, where k=−143, −142, . . . , −129, 128, 129, . . . , 143 are reserved and not used for transmission of the primary synchronization signal.

Figure 22:
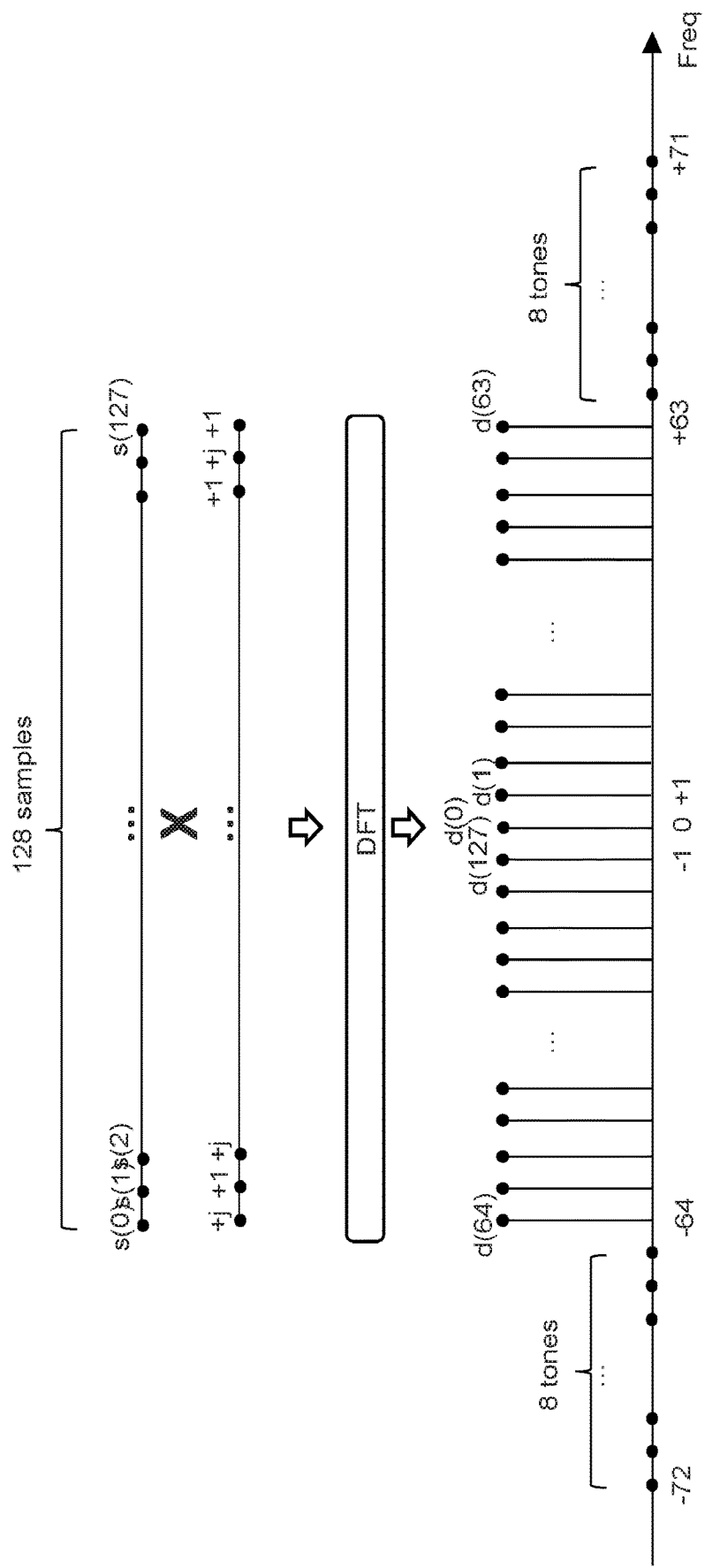
FIG. 22 illustrates sequence generation using an m-sequence of length 128 and BPSK/QBPSK modulation and DFT precoding in accordance with an example.

FIG. 22 illustrates an example of sequence generation using an m-sequence of length 128 and BPSK/QBPSK modulation and DFT precoding. The m-sequence of length 128 (i.e., 128 samples) can be represented by s(n). The m-sequence can range from s(0) to s(127). The m-sequence can be multiplied by an alternating sequence of {+1, +j}. Then a DFT operation can be performed to map the m-sequence (after being multiplied with the alternating sequence of {+1, +j}) to the frequency domain, and a sequence d(n) can be formed. The sequence d(n) can be mapped to resource elements (k,l) in the frequency domain. In this example, the sequence d(n) can be mapped to 128 samples that correspond to a range of k from −64 to +63, where 8 tones (e.g., ranging from k=−72 to k=−64) and 8 tones (e.g., ranging from k=+63 to k=+71) can be set to zero and surround the sequence d(n).

Figure 23:
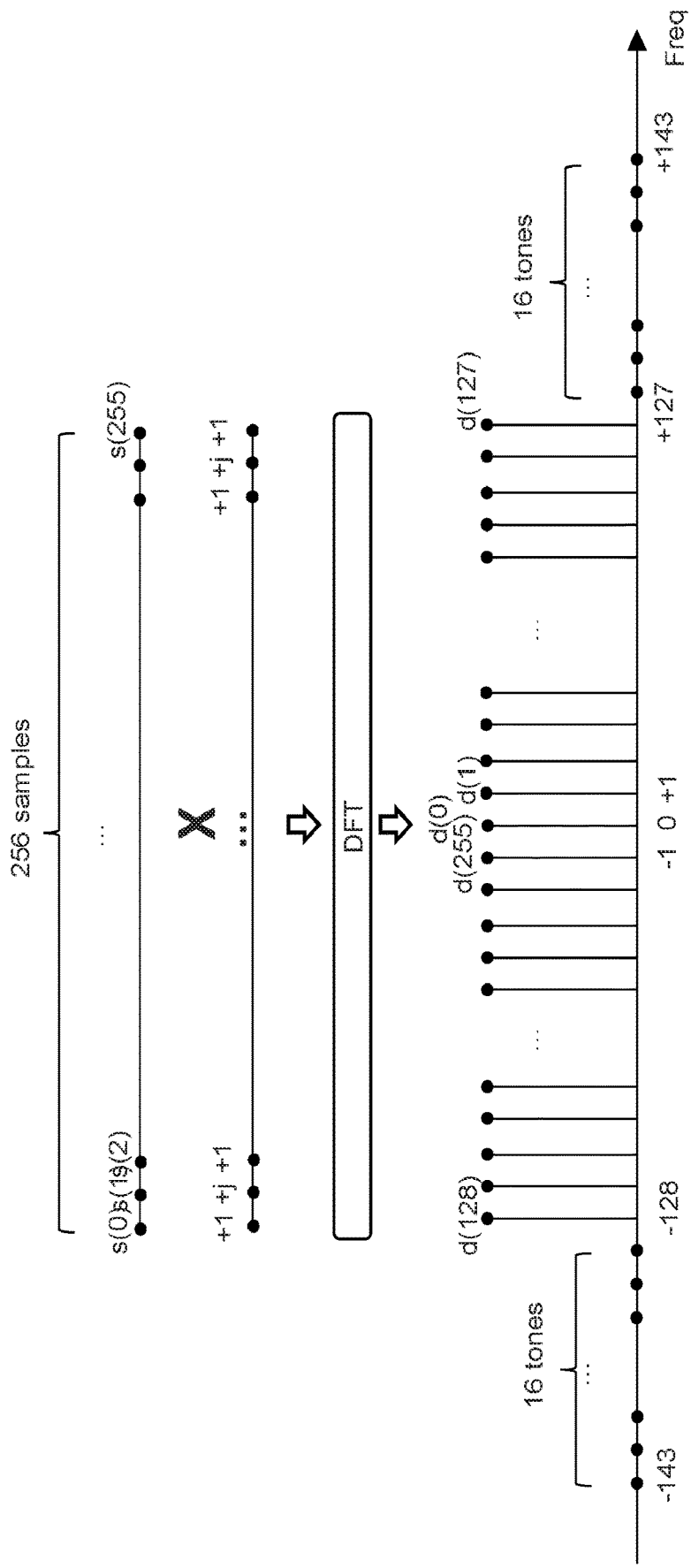
FIG. 23 illustrates sequence generation using an m-sequence of length 256 and BPSK/QBPSK modulation and DFT precoding in accordance with an example.

FIG. 23 illustrates an example of sequence generation using an m-sequence of length 256 and BPSK/QBPSK modulation and DFT precoding. The m-sequence of length 256 (i.e., 256 samples) can be represented by s(n). The m-sequence can range from s(0) to s(255). The m-sequence can be multiplied by an alternating sequence of {+1, +j}. Then a DFT operation can be performed to map the m-sequence (after being multiplied with the alternating sequence of $\{^{+1}, +j\}$) to the frequency domain, and a sequence d(n) can be formed. The sequence d(n) can be mapped to resource elements (k,l) in the frequency domain. In this example, the sequence d(n) can be mapped to 256 samples that correspond to a range of k from −128 to +127, where 16 tones (e.g., ranging from k=−143 to k=−128) and 16 tones (e.g., ranging from k=+127 to k=+143) can be set to zero and surround the sequence d(n).

In one configuration, for a length 127 sequence, or m-sequence, which can be represented as s(n), can be generated from polynomial $g(x)=x^7+x^6+x^5+x^4+x^3+x^2+1$ with an initial state of {0,0,0,0,0,1}. The binary m-sequence can be BPSK modulated, and a zero value can be appended to the length 127 sequence to create a length 128 sequence.

The zero appended m-sequence can be DFT precoded and mapped to the frequency domain.

In a first option, d(n) is in accordance with the following:

$$\hat{d}(n) = \begin{cases} 0, & n = 0 \\ 1 - 2 \cdot s(n-1), & n = 1, 3, 5, \Lambda, 127 \\ (1 - 2 \cdot s(n-1)) \cdot j, & n = 2, 4, 6, \Lambda, 126 \end{cases}$$

$$d(n) = \frac{1}{\sqrt{127}} \sum_{k=0}^{127} \hat{d}(k) \exp\left(-j\frac{2\pi k}{128}n\right).$$

In a second option, d(n) is in accordance with the following:

$$\hat{d}(n) = \begin{cases} 1 - 2 \cdot s(n), & n = 0, 2, 1, \Lambda, 126 \\ (1 - 2 \cdot s(n-1)) \cdot j, & n = 1, 3, 5, \Lambda, 127 \end{cases}$$

$$d(n) = \frac{1}{\sqrt{128}} \sum_{k=0}^{127} \hat{d}(k) \exp\left(-j\frac{2\pi k}{128}n\right)$$

In one example, the sequence s(n) formulation can be provided in the following recursive form:
s(n+7)=(n+6)+s(n+5)+s(n+4)+s(n+3)+s(n+2)+s(n))mod2, 0 n 126 where s(0)=1, s(1)=s(2)=s(3)=s(4)=s(5)=s(6)=0.

In one configuration, for a length 256 sequence, or m-sequence, which can be represented as s(n), can be generated from polynomial $g(x) = x^8+x^7+x^6+x^3+x^2+x^1+1$ and with an initial state of $\{0,0,0,0,0,0,0,1\}$. The binary m-sequence can be BPSK modulated, and a zero value can be appended to the length 255 sequence to create a length 256 sequence. The zero appended m-sequence can be DFT precoded and mapped to the frequency domain.

In a first option with zero padding, d(n) is in accordance with the following:

$$\hat{d}(n) = \begin{cases} 0, & n = 0 \\ 1 - 2 \cdot s(n-1), & n = 1, 3, 5, \Lambda, 255 \\ (1 - 2 \cdot s(n-1)) \cdot j, & n = 2, 4, 6, \Lambda, 254 \end{cases}$$

$$d(n) = \frac{1}{\sqrt{255}} \sum_{k=0}^{255} \hat{d}(k) \exp\left(-j\frac{2\pi k}{256}n\right).$$

In a second option with cyclic extension, d(n) is in accordance with the following:

$$\hat{d}(n) = \begin{cases} 1 - 2 \cdot s(n-1), & n = 0, 2, 4, \Lambda, 254 \\ (1 - 2 \cdot s(n-1)) \cdot j, & n = 1, 3, 5, \Lambda, 255 \end{cases}$$

$$d(n) = \frac{1}{\sqrt{256}} \sum_{k=0}^{255} \hat{d}(k) \exp\left(-j\frac{2\pi k}{256}n\right).$$

In one example, the sequence s(n) formulation can be provided in the following recursive form:
s(n+8)=(n+7)+s(n+6)+s(n+3)+s(n+2)+s(n+1)+s(n))mod2, 0≤n≤255 where s(0)=1, s(1)=s(2)=s(3)=s(4)=s(5)=s(6)= s(7)=0.

In one example, for a length 127 sequence, the sequence d(n) can be mapped to resource elements ($a_{k,l}$) in accordance with the following:

$a_{k,l}=d(n+64)\mod128), n=0, \ldots ,127$ k=n−64

In one example, the primary synchronization signal can be mapped to symbol l of an SS block. Resource elements (k, l) in the OFDM symbols can be used for transmission of the primary synchronization signal, where k=−72, −71, . . . , −65, 64, 65, . . . , 72 are reserved and not used for transmission of the primary synchronization signal.

In one example, for a length 255 sequence, the sequence d(n) can be mapped to resource elements ($a_{k,l}$) in accordance with the following:

$a_{k,l}=d(n+128) \mod 256), n=0, \ldots ,255$ k=n−128

In one example, the primary synchronization signal can be mapped to symbol l of the SS block. Resource elements (k,l) in the OFDM symbols can be used for transmission of the primary synchronization signal, where k=−143, −142, . . . , −129, 128, 129, . . . , 143 are reserved and not used for transmission of the primary synchronization signal.

In one configuration, a gNB can be operable to encode a primary synchronization signal for transmission to a UE. The gNB can identify a sequence d(n) for a primary synchronization signal. The sequence d(n) can be defined by: d(n)=1−2s(n). In this equation, s(n) can be a maximum run length sequence (m-sequence), and s(n) can be provided as s(n+7)=(s(n+4) +s(n)) mod 2, where 0≤n ≤127. The gNB can generate the primary synchronization signal based on the sequence d(n). The gNB can transmit the primary synchronization signal to the UE.

In one example, a sequence of symbols for the sequence d(n) that comprises the primary synchronization signal can be mapped to a range of subcarrier numbers k relative to a start of a synchronization signal block. The sequence of symbols for the sequence d(n) that comprises the primary synchronization signal can include 126 symbols. In addition, the range of subcarrier numbers k that include the sequence of symbols for the sequence d(n) can be between 56 and 182.

In one configuration, a technique is described for transmitting a modulated binary sequence that is extended, and precoded using discrete Fourier transform, and mapped to subcarriers in a frequency domain of an OFDM symbol. The modulated binary sequence can be extended based on a cyclic extension of the modulated binary sequence. The modulated binary sequence can be extended based on a zero padded extension of the modulated binary sequence. The binary sequence can be a maximum run length sequence (m-sequence) that is generated with a primitive polynomial. The binary sequence can be modulated using BPSK. A length of the binary sequence can be 63, 127 or 255. Alternatively, the length of the binary sequence can be 64, 128 or 256. In one example, the modulation of the binary sequence can be BPSK and pi/2 shifted BPSK, where the modulation of BPSK and pi/2 shifted BPSK can be alternated between consecutive bits of the binary sequence.

Figure 24:
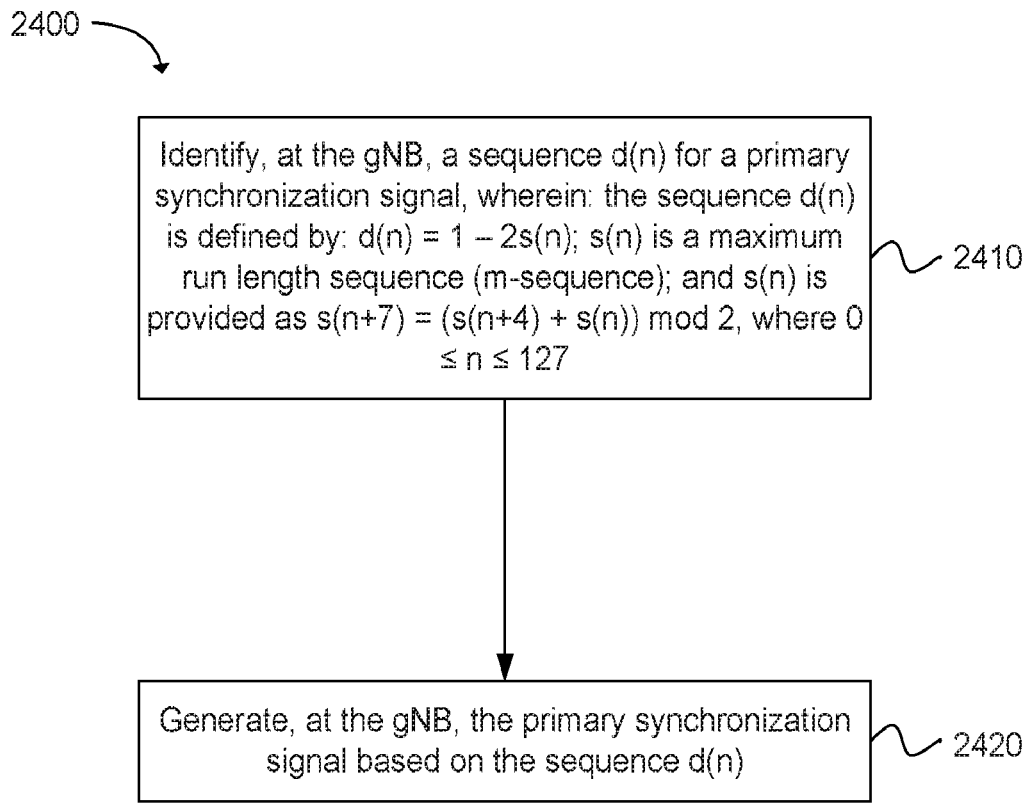
FIG. 24 depicts functionality of a Next Generation NodeB (gNB) operable to encode a primary synchronization signal for transmission to a user equipment (UE) in accordance with an example.

Another example provides functionality 2400 of a Next Generation NodeB (gNB) operable to encode a primary synchronization signal for transmission to a user equipment (UE), as shown in FIG. 24. The gNB can comprise one or more processors configured to identify, at the gNB, a sequence d(n) for a primary synchronization signal, wherein: the sequence d(n) is defined by: d(n)=1−2s(n); s(n) is a maximum run length sequence (m-sequence); and s(n) is provided as s(n+7)=(s(n+4) +s(n)) mod 2, where 0≤n≤127, as in block 2410. The gNB can comprise one or more processors configured to generate, at the gNB, the primary synchronization signal based on the sequence d(n), as in block 2420. In addition, the gNB can comprise a memory interface configured to retrieve from a memory the primary synchronization signal.

Figure 25:
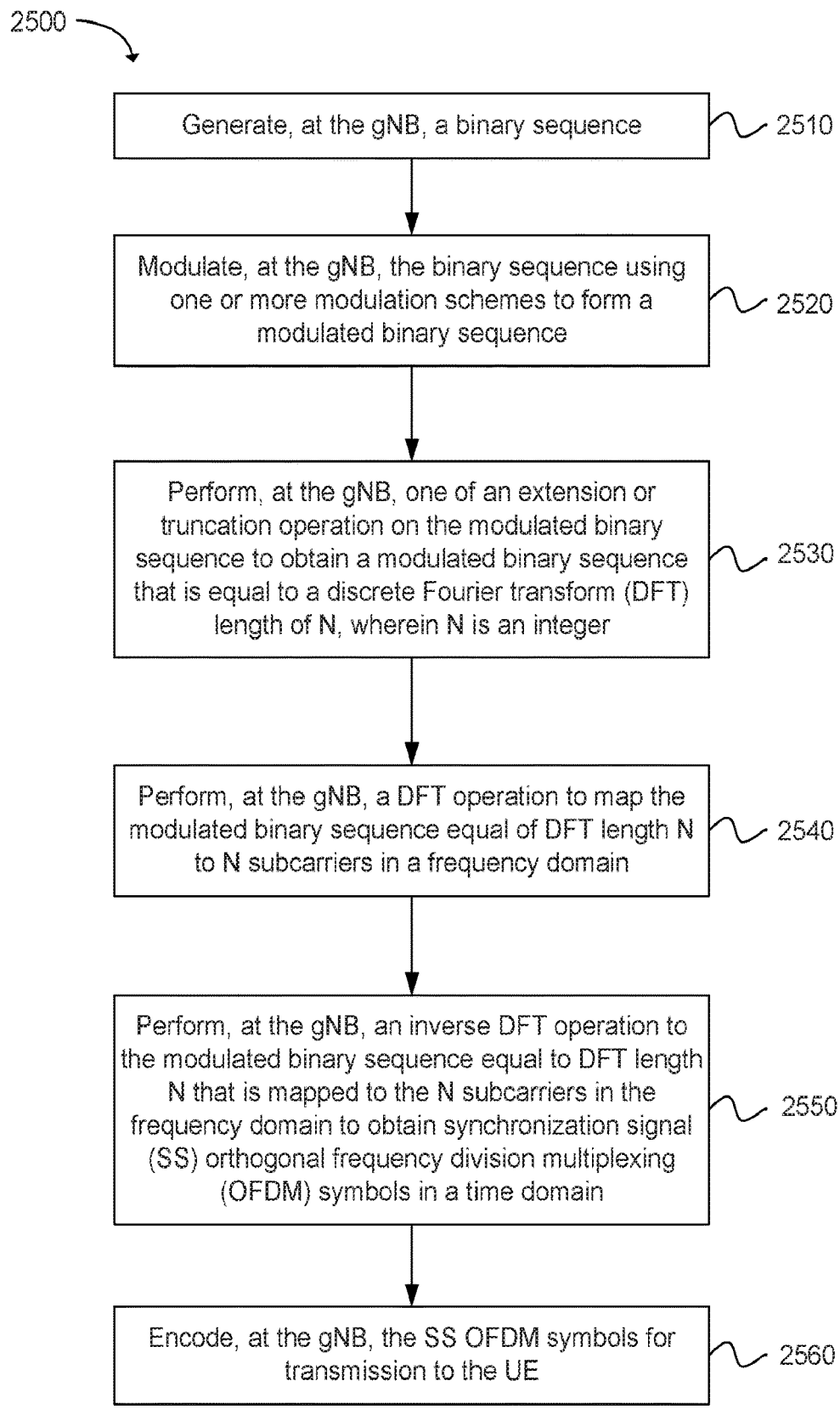
FIG. 25 depicts functionality of a Next Generation NodeB (gNB) operable to encode synchronization signals for transmission to a user equipment (UE) in accordance with an example.

Another example provides functionality 2500 of a Next Generation NodeB (gNB) operable to encode synchronization signals for transmission to a user equipment (UE), as shown in FIG. 25. The gNB can comprise one or more processors configured to generate, at the gNB, a binary sequence, as in block 2510. The gNB can comprise one or more processors configured to modulate, at the gNB, the binary sequence using one or more modulation schemes to form a modulated binary sequence, as in block 2520. The gNB can comprise one or more processors configured to perform, at the gNB, one of an extension or truncation operation on the modulated binary sequence to obtain a modulated binary sequence that is equal to a discrete Fourier transform (DFT) length of N, wherein N is an integer, as in block 2530. The gNB can comprise one or more processors configured to perform, at the gNB, a DFT operation to map the modulated binary sequence equal of DFT length N to N subcarriers in a frequency domain, as in block 2540. The gNB can comprise one or more processors configured to perform, at the gNB, an inverse DFT operation to the modulated binary sequence equal to DFT length N that is mapped to the N subcarriers in the frequency domain to obtain synchronization signal (SS) orthogonal frequency division multiplexing (OFDM) symbols in a time domain, as in block 2550. The gNB can comprise one or more processors configured to encode, at the gNB, the SS OFDM symbols for transmission to the UE, as in block 2560. In addition, the gNB can comprise a memory interface configured to retrieve from a memory the SS OFDM symbols.

Figure 26:
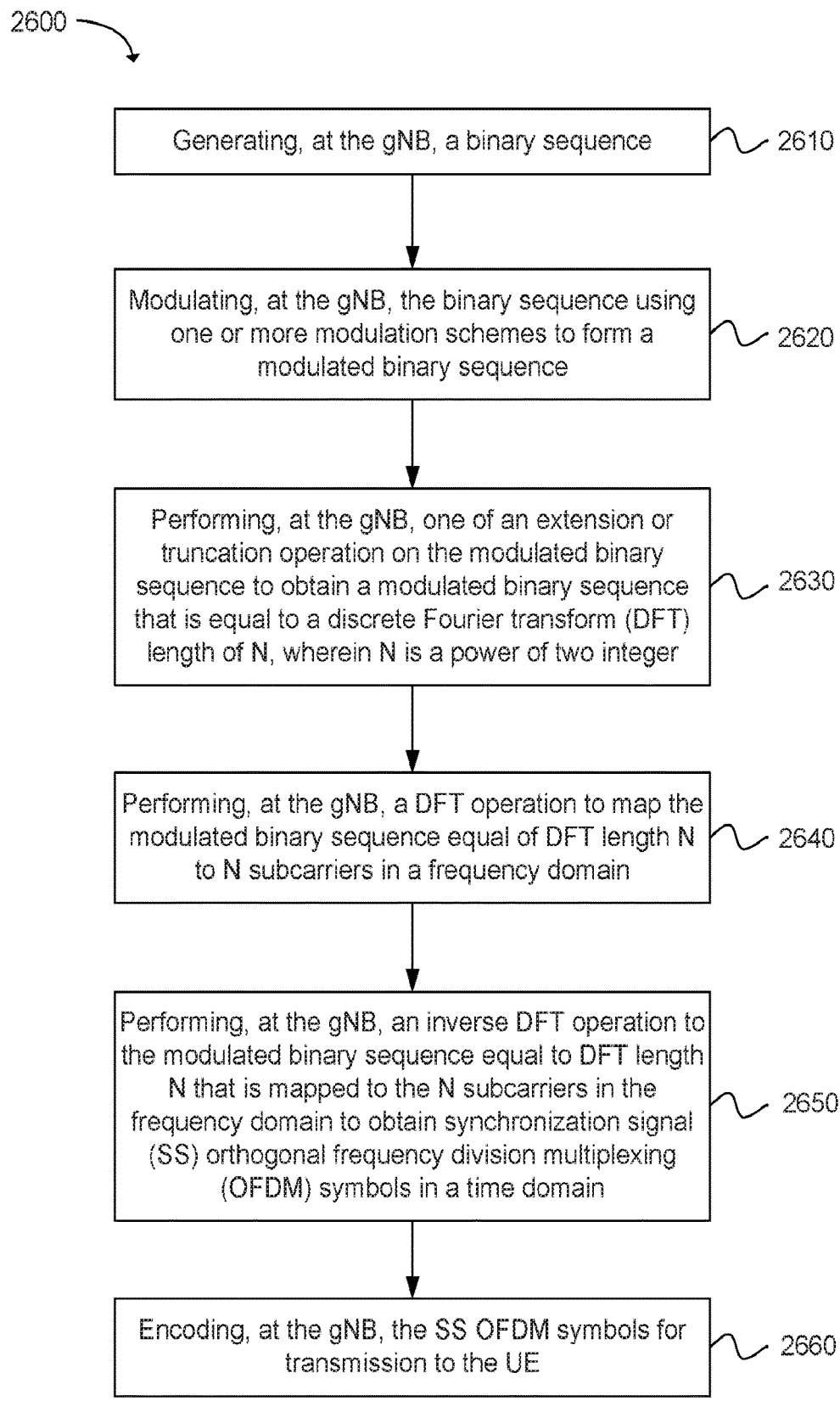
FIG. 26 depicts a flowchart of a machine readable storage medium having instructions embodied thereon for encoding synchronization signals for transmission from a Next Generation NodeB (gNB) to a user equipment (UE) in accordance with an example.

Another example provides at least one machine readable storage medium having instructions 2600 embodied thereon for encoding synchronization signals for transmission from a Next Generation NodeB (gNB) to a user equipment (UE), as shown in FIG. 26. The instructions can be executed on a machine, where the instructions are included on at least one computer readable medium or one non-transitory machine readable storage medium. The instructions when executed by one or more processors of the gNB perform: generating, at the gNB, a binary sequence, as in block 2610. The instructions when executed by one or more processors of the gNB perform: modulating, at the gNB, the binary sequence using one or more modulation schemes to form a modulated binary sequence, as in block 2620. The instructions when executed by one or more processors of the gNB perform: performing, at the gNB, one of an extension or truncation operation on the modulated binary sequence to obtain a modulated binary sequence that is equal to a discrete Fourier transform (DFT) length of N, wherein N is a power of two integer, as in block 2630. The instructions when executed by one or more processors of the gNB perform: performing, at the gNB, a DFT operation to map the modulated binary sequence equal of DFT length N to N subcarriers in a frequency domain, as in block 2640. The instructions when executed by one or more processors of the gNB perform: performing, at the gNB, an inverse DFT operation to the modulated binary sequence equal to DFT length N that is mapped to the N subcarriers in the frequency domain to obtain synchronization signal (SS) orthogonal frequency division multiplexing (OFDM) symbols in a time domain, as in block 2650. The instructions when executed by one or more processors of the gNB perform: encoding, at the gNB, the SS OFDM symbols for transmission to the UE, as in block 2660.

Figure 27:
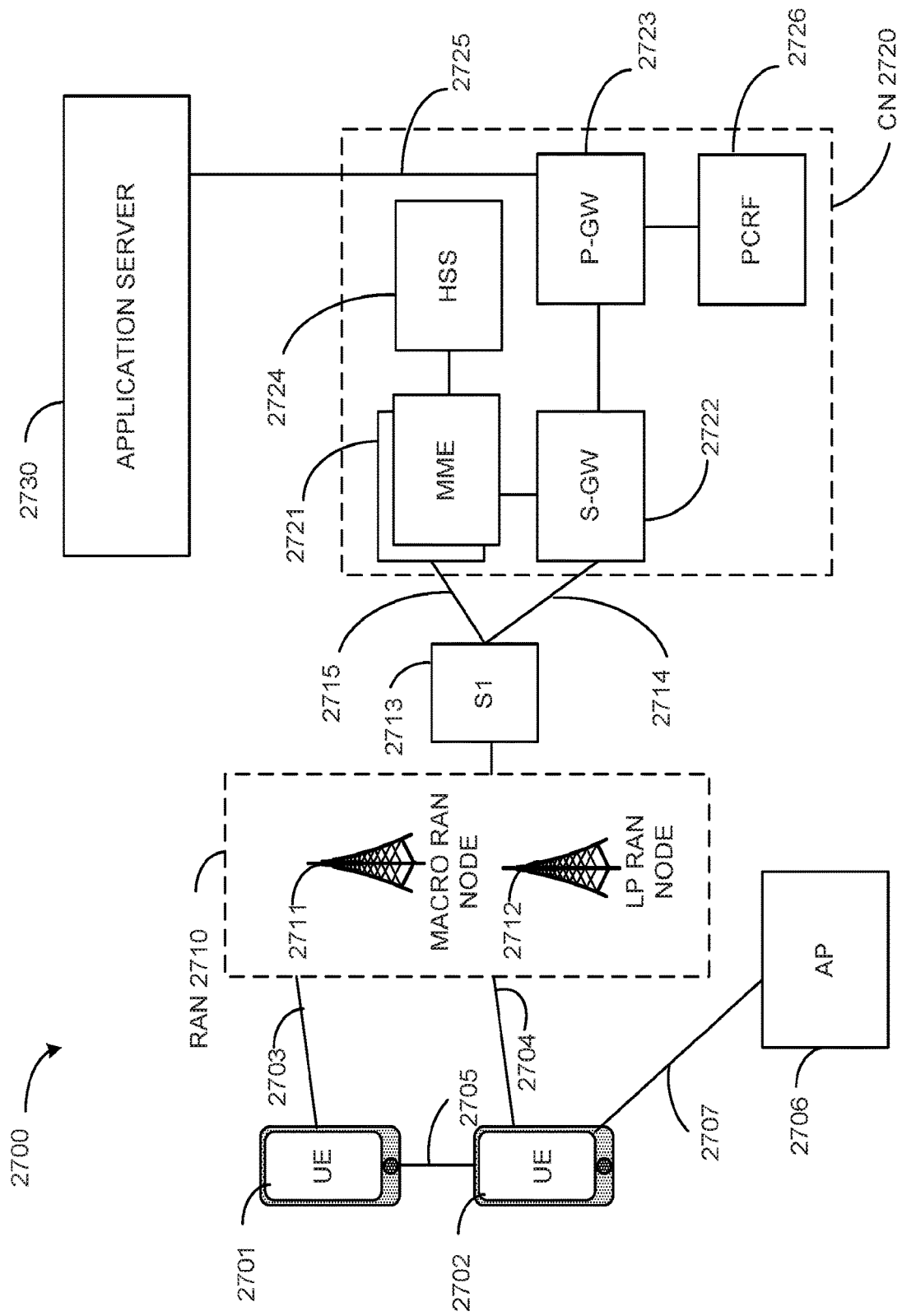
FIG. 27 illustrates an architecture of a wireless network in accordance with an example.

FIG. 27 illustrates an architecture of a system 2700 of a network in accordance with some embodiments. The system 2700 is shown to include a user equipment (UE) 2701 and a UE 2702. The UEs 2701 and 2702 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 2701 and 2702 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 2701 and 2702 may be configured to connect, e.g., communicatively couple, with a radio access network (RAN) 2710—the RAN 2710 may be, for example, an Evolved Universal Mobile Telecommunications System (UMTS) Terrestrial Radio Access Network (E-UTRAN), a NextGen RAN (NG RAN), or some other type of RAN. The UEs 2701 and 2702 utilize connections 2703 and 2704, respectively, each of which comprises a physical communications interface or layer (discussed in further detail below); in this example, the connections 2703 and 2704 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 2701 and 2702 may further directly exchange communication data via a ProSe interface 2705. The ProSe interface 2705 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 2702 is shown to be configured to access an access point (AP) 2706 via connection 2707. The connection 2707 can comprise a local wireless connection, such as a connection consistent with any IEEE 2802.15 protocol, wherein the AP 2706 would comprise a wireless fidelity (WiFi®) router. In this example, the AP 2706 is shown to be connected to the Internet without connecting to the core network of the wireless system (described in further detail below).

The RAN 2710 can include one or more access nodes that enable the connections 2703 and 2704. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 2710 may include one or more RAN nodes for providing macrocells, e.g., macro RAN node 2711, and one or more RAN nodes for providing femtocells or picocells (e.g., cells having smaller coverage areas, smaller user capacity, or higher bandwidth compared to macrocells), e.g., low power (LP) RAN node 2712.

Any of the RAN nodes 2711 and 2712 can terminate the air interface protocol and can be the first point of contact for the UEs 2701 and 2702. In some embodiments, any of the RAN nodes 2711 and 2712 can fulfill various logical functions for the RAN 2710 including, but not limited to, radio network controller (RNC) functions such as radio bearer management, uplink and downlink dynamic radio resource management and data packet scheduling, and mobility management.

In accordance with some embodiments, the UEs 2701 and 2702 can be configured to communicate using Orthogonal Frequency-Division Multiplexing (OFDM) communication signals with each other or with any of the RAN nodes 2711 and 2712 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 2711 and 2712 to the UEs 2701 and 2702, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 2701 and 2702. The physical downlink control channel (PDCCH) may carry information about the transport format and resource allocations related to the PDSCH channel, among other things. It may also inform the UEs 2701 and 2702 about the transport format, resource allocation, and H-ARQ (Hybrid Automatic Repeat Request) information related to the uplink shared channel. Typically, downlink scheduling (assigning control and shared channel resource blocks to the UE 2702 within a cell) may be performed at any of the RAN nodes 2711 and 2712 based on channel quality information fed back from any of the UEs 2701 and 2702. The downlink resource assignment information may be sent on the PDCCH used for (e.g., assigned to) each of the UEs 2701 and 2702.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 2710 is shown to be communicatively coupled to a core network (CN) 2720—via an 51 interface 2713. In embodiments, the CN 2720 may be an evolved packet core (EPC) network, a NextGen Packet Core (NPC) network, or some other type of CN. In this embodiment the S1 interface 2713 is split into two parts: the S1U interface 2714, which carries traffic data between the RAN nodes 2711 and 2712 and the serving gateway (S-GW) 2722, and the S1-mobility management entity (MME) interface 2715, which is a signaling interface between the RAN nodes 2711 and 2712 and MMEs 2721.

In this embodiment, the CN 2720 comprises the MMEs 2721, the S-GW 2722, the Packet Data Network (PDN) Gateway (P-GW) 2723, and a home subscriber server (HSS) 2724. The MMEs 2721 may be similar in function to the control plane of legacy Serving General Packet Radio Service (GPRS) Support Nodes (SGSN). The MMEs 2721 may manage mobility aspects in access such as gateway selection and tracking area list management. The HSS 2724 may comprise a database for network users, including subscription-related information to support the network entities' handling of communication sessions. The CN 2720 may comprise one or several HSSs 2724, depending on the number of mobile subscribers, on the capacity of the equipment, on the organization of the network, etc. For example, the HSS 2724 can provide support for routing/roaming, authentication, authorization, naming/addressing resolution, location dependencies, etc.

The S-GW 2722 may terminate the S1 interface 2713 towards the RAN 2710, and routes data packets between the RAN 2710 and the CN 2720. In addition, the S-GW 2722 may be a local mobility anchor point for inter-RAN node handovers and also may provide an anchor for inter-3GPP mobility. Other responsibilities may include lawful intercept, charging, and some policy enforcement.

The P-GW 2723 may terminate an SGi interface toward a PDN. The P-GW 2723 may route data packets between the EPC network 2723 and external networks such as a network including the application server 2730 (alternatively referred to as application function (AF)) via an Internet Protocol (IP) interface 2725. Generally, the application server 2730 may be an element offering applications that use IP bearer resources with the core network (e.g., UMTS Packet Services (PS) domain, LTE PS data services, etc.). In this embodiment, the P-GW 2723 is shown to be communicatively coupled to an application server 2730 via an IP communications interface 2725. The application server 2730 can also be configured to support one or more communication services (e.g., Voice-over-Internet Protocol (VoIP) sessions, PTT sessions, group communication sessions, social networking services, etc.) for the UEs 2701 and 2702 via the CN 2720.

The P-GW 2723 may further be a node for policy enforcement and charging data collection. Policy and Charging Enforcement Function (PCRF) 2726 is the policy and charging control element of the CN 2720. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 2726 may be communicatively coupled to the application server 2730 via the P-GW 2723. The application server 2730 may signal the PCRF 2726 to indicate a new service flow and select the appropriate Quality of Service (QoS) and charging parameters. The PCRF 2726 may provision this rule into a Policy and Charging Enforcement Function (PCEF) (not shown) with the appropriate traffic flow template (TFT) and QoS class of identifier (QCI), which commences the QoS and charging as specified by the application server 2730.

Figure 28:
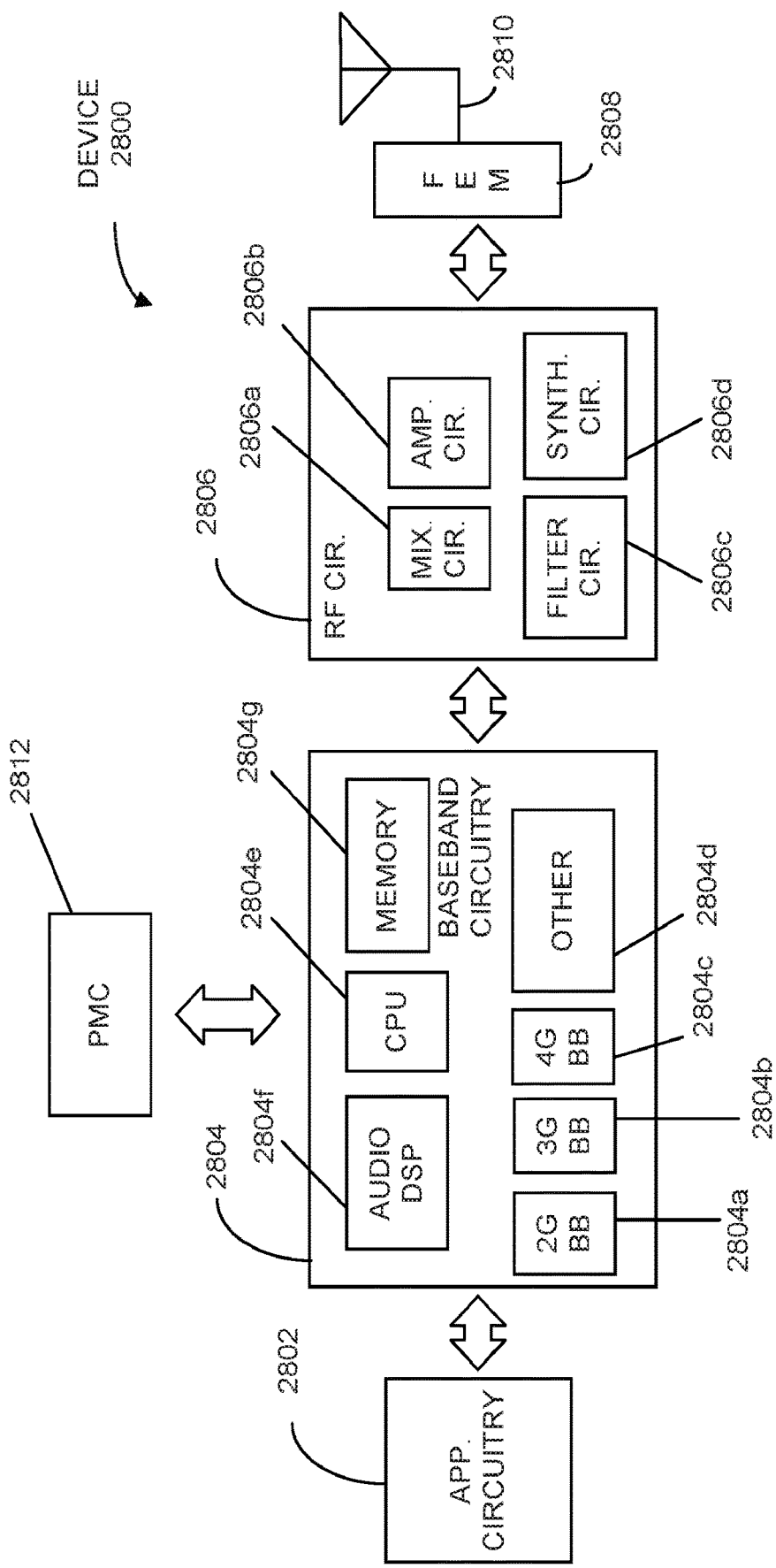
FIG. 28 illustrates a diagram of a wireless device (e.g., UE) in accordance with an example.

FIG. 28 illustrates example components of a device 2800 in accordance with some embodiments. In some embodiments, the device 2800 may include application circuitry 2802, baseband circuitry 2804, Radio Frequency (RF) circuitry 2806, front-end module (FEM) circuitry 2808, one or more antennas 2810, and power management circuitry (PMC) 2812 coupled together at least as shown. The components of the illustrated device 2800 may be included in a UE or a RAN node. In some embodiments, the device 2800 may include less elements (e.g., a RAN node may not utilize application circuitry 2802, and instead include a processor/controller to process IP data received from an EPC). In some embodiments, the device 2800 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 2802 may include one or more application processors. For example, the application circuitry 2802 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 2800. In some embodiments, processors of application circuitry 2802 may process IP data packets received from an EPC.

The baseband circuitry 2804 may include circuitry such as, but not limited to, one or more single-core or multi-core processors. The baseband circuitry 2804 may include one or more baseband processors or control logic to process baseband signals received from a receive signal path of the RF circuitry 2806 and to generate baseband signals for a transmit signal path of the RF circuitry 2806. Baseband processing circuity 2804 may interface with the application circuitry 2802 for generation and processing of the baseband signals and for controlling operations of the RF circuitry 2806. For example, in some embodiments, the baseband circuitry 2804 may include a third generation (3G) baseband processor 2804*a*, a fourth generation (4G) baseband processor 2804*b*, a fifth generation (5G) baseband processor 2804*c*, or other baseband processor(s) 2804*d* for other existing generations, generations in development or to be developed in the future (e.g., second generation (2G), sixth generation (6G), etc.). The baseband circuitry 2804 (e.g., one or more of baseband processors 2804*a-d*) may handle various radio control functions that enable communication with one or more radio networks via the RF circuitry 2806. In other embodiments, some or all of the functionality of baseband processors 2804*a-d* may be included in modules stored in the memory 2804*g* and executed via a Central Processing Unit (CPU) 2804*e*. The radio control functions may include, but are not limited to, signal modulation/demodulation, encoding/decoding, radio frequency shifting, etc. In some embodiments, modulation/demodulation circuitry of the baseband circuitry 2804 may include Fast-Fourier Transform (FFT), precoding, or constellation mapping/demapping functionality. In some embodiments, encoding/decoding circuitry of the baseband circuitry 2804 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 2804 may include one or more audio digital signal processor(s) (DSP) 2804*f*. The audio DSP(s) 2804*f* may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 2804 and the application circuitry 2802 may be implemented together such as, for example, on a system on a chip (SOC).

In some embodiments, the baseband circuitry 2804 may provide for communication compatible with one or more radio technologies. For example, in some embodiments, the baseband circuitry 2804 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 2804 is configured to support radio communications of more than one wireless protocol may be referred to as multi-mode baseband circuitry.

RF circuitry 2806 may enable communication with wireless networks using modulated electromagnetic radiation through a non-solid medium. In various embodiments, the RF circuitry 2806 may include switches, filters, amplifiers, etc. to facilitate the communication with the wireless network. RF circuitry 2806 may include a receive signal path which may include circuitry to down-convert RF signals received from the FEM circuitry 2808 and provide baseband signals to the baseband circuitry 2804. RF circuitry 2806 may also include a transmit signal path which may include circuitry to up-convert baseband signals provided by the baseband circuitry 2804 and provide RF output signals to the FEM circuitry 2808 for transmission.

In some embodiments, the receive signal path of the RF circuitry 2806 may include mixer circuitry 2806*a*, amplifier circuitry 2806*b* and filter circuitry 2806*c*. In some embodiments, the transmit signal path of the RF circuitry 2806 may include filter circuitry 2806*c* and mixer circuitry 2806*a*. RF circuitry 2806 may also include synthesizer circuitry 2806*d* for synthesizing a frequency for use by the mixer circuitry 2806*a* of the receive signal path and the transmit signal path. In some embodiments, the mixer circuitry 2806*a* of the receive signal path may be configured to down-convert RF signals received from the FEM circuitry 2808 based on the synthesized frequency provided by synthesizer circuitry 2806*d*. The amplifier circuitry 2806*b* may be configured to amplify the down-converted signals and the filter circuitry 2806*c* may be a low-pass filter (LPF) or band-pass filter (BPF) configured to remove unwanted signals from the down-converted signals to generate output baseband signals. Output baseband signals may be provided to the baseband circuitry 2804 for further processing. In some embodiments, the output baseband signals may be zero-frequency baseband signals, although this is not a necessity. In some embodiments, mixer circuitry 2806*a* of the receive signal path may comprise passive mixers, although the scope of the embodiments is not limited in this respect.

In some embodiments, the mixer circuitry 2806*a* of the transmit signal path may be configured to up-convert input baseband signals based on the synthesized frequency provided by the synthesizer circuitry 2806*d* to generate RF output signals for the FEM circuitry 2808. The baseband signals may be provided by the baseband circuitry 2804 and may be filtered by filter circuitry 2806*c*.

In some embodiments, the mixer circuitry 2806*a* of the receive signal path and the mixer circuitry 2806*a* of the transmit signal path may include two or more mixers and may be arranged for quadrature downconversion and upconversion, respectively. In some embodiments, the mixer circuitry 2806*a* of the receive signal path and the mixer circuitry 2806*a* of the transmit signal path may include two or more mixers and may be arranged for image rejection (e.g., Hartley image rejection). In some embodiments, the mixer circuitry 2806*a* of the receive signal path and the mixer circuitry 2806*a* may be arranged for direct downconversion and direct upconversion, respectively. In some embodiments, the mixer circuitry 2806*a* of the receive signal path and the mixer circuitry 2806*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 2806 may include analog-to-digital converter (ADC) and digital-to-analog converter (DAC) circuitry and the baseband circuitry 2804 may include a digital baseband interface to communicate with the RF circuitry 2806.

In some dual-mode embodiments, a separate radio IC circuitry may be provided for processing signals for each spectrum, although the scope of the embodiments is not limited in this respect.

In some embodiments, the synthesizer circuitry 2806*d* may be a fractional-N synthesizer or a fractional N/N+1 synthesizer, although the scope of the embodiments is not limited in this respect as other types of frequency synthesizers may be suitable. For example, synthesizer circuitry 2806*d* may be a delta-sigma synthesizer, a frequency multiplier, or a synthesizer comprising a phase-locked loop with a frequency divider.

The synthesizer circuitry 2806*d* may be configured to synthesize an output frequency for use by the mixer circuitry 2806*a* of the RF circuitry 2806 based on a frequency input and a divider control input. In some embodiments, the synthesizer circuitry 2806*d* may be a fractional N/N+1 synthesizer.

In some embodiments, frequency input may be provided by a voltage controlled oscillator (VCO), although that is not a necessity. Divider control input may be provided by either the baseband circuitry 2804 or the applications processor 2802 depending on the desired output frequency. In some embodiments, a divider control input (e.g., N) may be determined from a look-up table based on a channel indicated by the applications processor 2802.

Synthesizer circuitry 2806*d* of the RF circuitry 2806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 2806*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 2806 may include an IQ/polar converter.

FEM circuitry 2808 may include a receive signal path which may include circuitry configured to operate on RF signals received from one or more antennas 2810, amplify the received signals and provide the amplified versions of the received signals to the RF circuitry 2806 for further processing. FEM circuitry 2808 may also include a transmit signal path which may include circuitry configured to amplify signals for transmission provided by the RF circuitry 2806 for transmission by one or more of the one or more antennas 2810. In various embodiments, the amplification through the transmit or receive signal paths may be done solely in the RF circuitry 2806, solely in the FEM 2808, or in both the RF circuitry 2806 and the FEM 2808.

In some embodiments, the FEM circuitry 2808 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 2806). The transmit signal path of the FEM circuitry 2808 may include a power amplifier (PA) to amplify input RF signals (e.g., provided by RF circuitry 2806), and one or more filters to generate RF signals for subsequent transmission (e.g., by one or more of the one or more antennas 2810).

In some embodiments, the PMC 2812 may manage power provided to the baseband circuitry 2804. In particular, the PMC 2812 may control power-source selection, voltage scaling, battery charging, or DC-to-DC conversion. The PMC 2812 may often be included when the device 2800 is capable of being powered by a battery, for example, when the device is included in a UE. The PMC 2812 may increase the power conversion efficiency while providing desirable implementation size and heat dissipation characteristics.

While FIG. 28 shows the PMC 2812 coupled only with the baseband circuitry 2804. However, in other embodiments, the PMC 2812 may be additionally or alternatively coupled with, and perform similar power management operations for, other components such as, but not limited to, application circuitry 2802, RF circuitry 2806, or FEM 2808.

In some embodiments, the PMC 2812 may control, or otherwise be part of, various power saving mechanisms of the device 2800. For example, if the device 2800 is in an RRC_Connected state, where it is still connected to the RAN node as it expects to receive traffic shortly, then it may enter a state known as Discontinuous Reception Mode (DRX) after a period of inactivity. During this state, the device 2800 may power down for brief intervals of time and thus save power.

If there is no data traffic activity for an extended period of time, then the device 2800 may transition off to an RRC_Idle state, where it disconnects from the network and does not perform operations such as channel quality feedback, handover, etc. The device 2800 goes into a very low power state and it performs paging where again it periodically wakes up to listen to the network and then powers down again. The device 2800 may not receive data in this state, in order to receive data, it can transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 2802 and processors of the baseband circuitry 2804 may be used to execute elements of one or more instances of a protocol stack. For example, processors of the baseband circuitry 2804, alone or in combination, may be used execute Layer 3, Layer 2, or Layer 1 functionality, while processors of the application circuitry 2804 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 29:
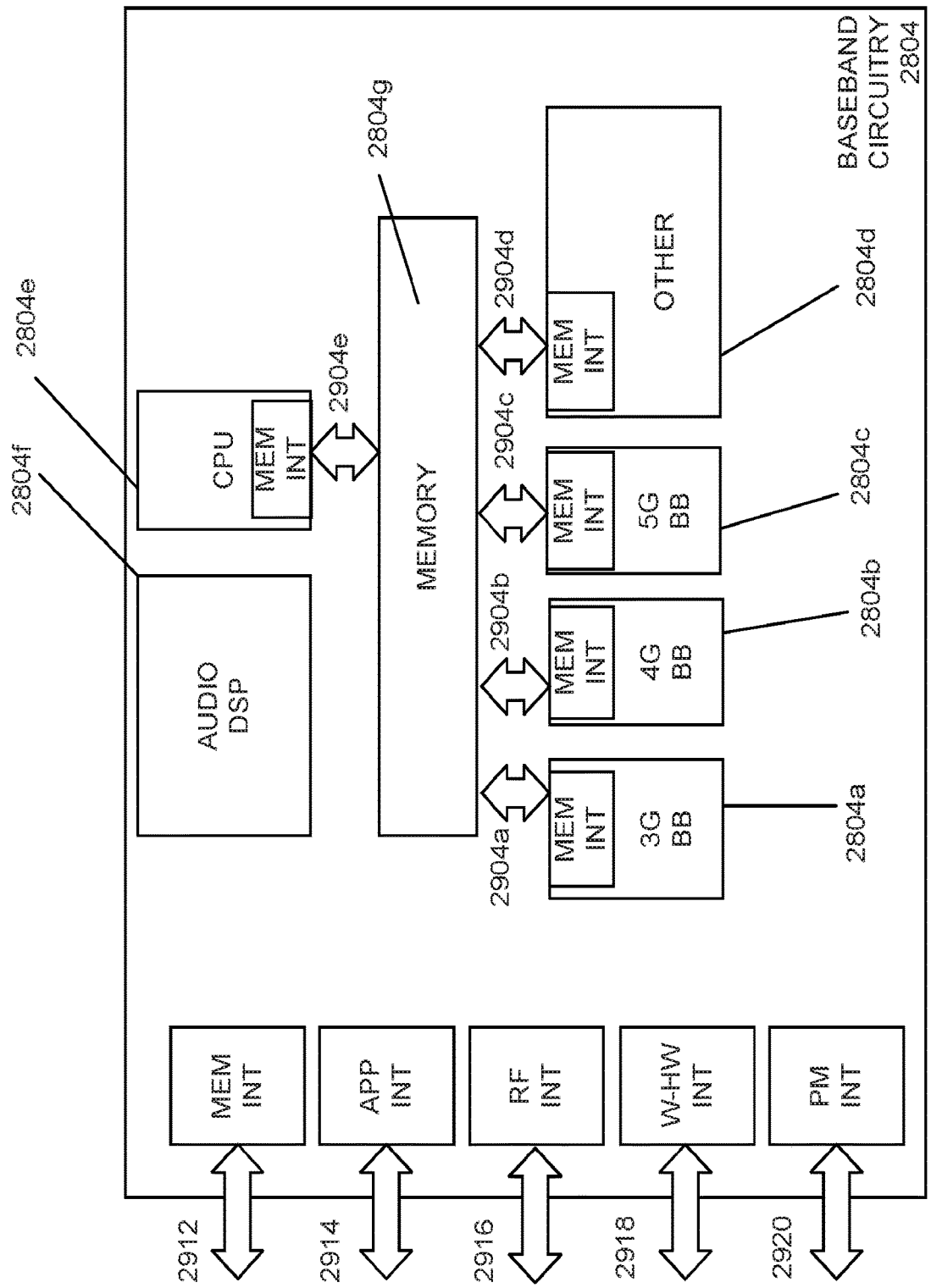
FIG. 29 illustrates interfaces of baseband circuitry in accordance with an example.

FIG. 29 illustrates example interfaces of baseband circuitry in accordance with some embodiments. As discussed above, the baseband circuitry 2804 of FIG. 28 may comprise processors 2804a-2804e and a memory 2804g utilized by said processors. Each of the processors 2804a-2804e may include a memory interface, 2904a-2904e, respectively, to send/receive data to/from the memory 2804g.

The baseband circuitry 2804 may further include one or more interfaces to communicatively couple to other circuitries/devices, such as a memory interface 2912 (e.g., an interface to send/receive data to/from memory external to the baseband circuitry 2804), an application circuitry interface 2914 (e.g., an interface to send/receive data to/from the application circuitry 2802 of FIG. 28), an RF circuitry interface 2916 (e.g., an interface to send/receive data to/from RF circuitry 2806 of FIG. 28), a wireless hardware connectivity interface 2918 (e.g., an interface to send/receive data to/from Near Field Communication (NFC) components, Bluetooth® components (e.g., Bluetooth® Low Energy), Wi-Fi® components, and other communication components), and a power management interface 2920 (e.g., an interface to send/receive power or control signals to/from the PMC 2812.

Figure 30:
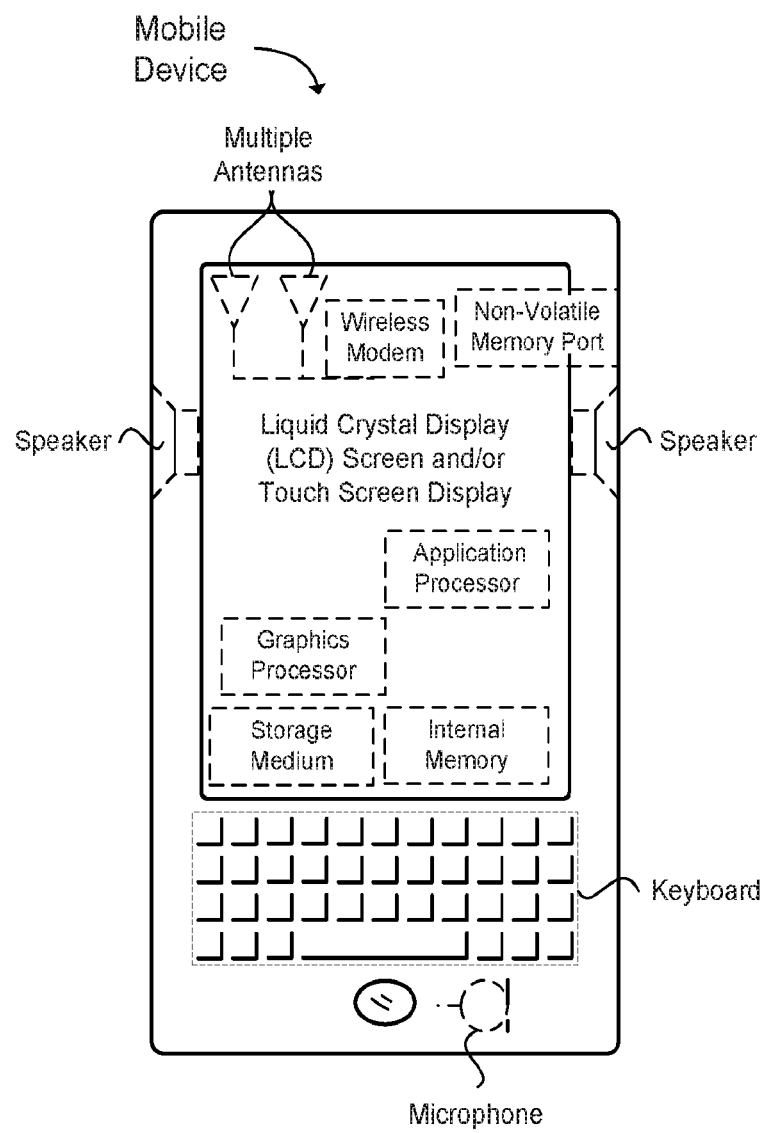
FIG. 30 illustrates a diagram of a wireless device (e.g., UE) in accordance with an example.

FIG. 30 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 30 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes an apparatus of a Next Generation NodeB (gNB) operable to encode a primary synchronization signal for transmission to a user equipment (UE), the apparatus comprising: one or more processors configured to: identify, at the gNB, a sequence d(n) for a primary synchronization signal, wherein: the sequence d(n) is defined by: $d(n)=1-2s(n)$; $s(n)$ is a maximum run length sequence (m-sequence); and $s(n)$ is provided as $s(n+7)=(s(n+4)+s(n))$ mod 2, where $0 \leq n \leq 127$; generate, at the gNB, the primary synchronization signal based on the sequence d(n); and encode, at the gNB, the primary synchronization signal for transmission to the UE; and a memory interface configured to retrieve from a memory the primary synchronization signal.

Example 2 includes the apparatus of Example 1, further comprising a transceiver configured to transmit the primary synchronization signal to the UE.

Example 3 includes the apparatus of any of Examples 1 to 2, wherein a sequence of symbols for the sequence d(n) that comprises the primary synchronization signal is mapped to a range of subcarrier numbers k relative to a start of a synchronization signal block.

Example 4 includes the apparatus of any of Examples 1 to 3, wherein the sequence of symbols for the sequence d(n) that comprises the primary synchronization signal includes 126 symbols.

Example 5 includes the apparatus of any of Examples 1 to 4, wherein the range of subcarrier numbers k that include the sequence of symbols for the sequence d(n) is between 56 and 182.

Example 6 includes an apparatus of a Next Generation NodeB (gNB) operable to encode synchronization signals for transmission to a user equipment (UE), the apparatus comprising: one or more processors configured to: generate, at the gNB, a binary sequence; modulate, at the gNB, the binary sequence using one or more modulation schemes to form a modulated binary sequence; perform, at the gNB, one of an extension or truncation operation on the modulated binary sequence to obtain a modulated binary sequence that is equal to a discrete Fourier transform (DFT) length of N, wherein N is an integer; perform, at the gNB, a DFT operation to map the modulated binary sequence equal of DFT length N to N subcarriers in a frequency domain; perform, at the gNB, an inverse DFT operation to the modulated binary sequence equal to DFT length N that is mapped to the N subcarriers in the frequency domain to obtain synchronization signal (SS) orthogonal frequency division multiplexing (OFDM) symbols in a time domain; and encode, at the gNB, the SS OFDM symbols for transmission to the UE; and a memory interface configured to retrieve from a memory the SS OFDM symbols.

Example 7 includes the apparatus of Example 6, further comprising a transceiver configured to transmit the SS OFDM symbols to the UE.

Example 8 includes the apparatus of any of Examples 6 to 7, wherein the SS OFDM symbols form a primary synchronization signal.

Example 9 includes the apparatus of any of Examples 6 to 8, wherein the one more processors are configured to perform a multiplication operation to the modulated binary sequence prior to the DFT operation, wherein the multiplication operation involves multiplying the modulated binary sequence with an alternating sequence of $\{+1, +j\}$ that is mapped to even or odd subcarriers in the frequency domain.

Example 10 includes the apparatus of any of Examples 6 to 9, wherein the one more processors are configured to generate the binary sequence based on an m-sequence that is generated using a primitive polynomial.

Example 11 includes the apparatus of any of Examples 6 to 10, wherein the one more processors are configured to generate the binary sequence based on a maximum run length sequence (m-sequence) that is generated using a primitive polynomial.

Example 12 includes the apparatus of any of Examples 6 to 11, wherein the one more processors are configured to insert a cyclic prefix prior to the SS OFDM symbols in the time domain.

Example 13 includes the apparatus of any of Examples 6 to 12, wherein the one or more modulation schemes includes one or more binary phase shift keying (BPSK) or quaternary binary phase shift keying (QBPSK).

Example 14 includes the apparatus of any of Examples 6 to 13, wherein N is a power of two integer.

Example 15 includes the apparatus of any of Examples 6 to 14, wherein the binary sequence has a length of 63, 127 or 255 samples.

Example 16 includes the apparatus of any of Examples 6 to 15, wherein the binary sequence has an extended length of 64, 128 or 256 samples.

Example 17 includes at least one machine readable storage medium having instructions embodied thereon for encoding synchronization signals for transmission from a Next Generation NodeB (gNB) to a user equipment (UE), the instructions when executed by one or more processors of the gNB perform the following: generating, at the gNB, a binary sequence; modulating, at the gNB, the binary sequence using one or more modulation schemes to form a modulated binary sequence; performing, at the gNB, one of an extension or truncation operation on the modulated binary sequence to obtain a modulated binary sequence that is equal to a discrete Fourier transform (DFT) length of N, wherein N is a power of two integer; performing, at the gNB, a DFT operation to map the modulated binary sequence equal of DFT length N to N subcarriers in a frequency domain; performing, at the gNB, an inverse DFT operation to the modulated binary sequence equal to DFT length N that is mapped to the N subcarriers in the frequency domain to obtain synchronization signal (SS) orthogonal frequency division multiplexing (OFDM) symbols in a time domain; and encoding, at the gNB, the SS OFDM symbols for transmission to the UE.

Example 18 includes the at least one machine readable storage medium of Example 17, wherein the SS OFDM symbols form a primary synchronization signal.

Example 19 includes the at least one machine readable storage medium of any of Examples 17 to 18, further comprising instructions when executed perform the following: performing a multiplication operation to the modulated binary sequence prior to the DFT operation, wherein the multiplication operation involves multiplying the modulated binary sequence with an alternating sequence of $\{+1, +j\}$ that is mapped to even or odd subcarriers in the frequency domain.

Example 20 includes the at least one machine readable storage medium of any of Examples 17 to 19, further comprising instructions when executed perform the following: generating the binary sequence based on an m-sequence that is generated using a primitive polynomial.

Example 21 includes the at least one machine readable storage medium of any of Examples 17 to 20, further comprising instructions when executed perform the following: generating the binary sequence based on a maximum run length sequence (m-sequence) that is generated using a primitive polynomial.

Example 22 includes the at least one machine readable storage medium of any of Examples 17 to 21, further comprising instructions when executed perform the following: inserting a cyclic prefix prior to the SS OFDM symbols in the time domain.

Example 23 includes the at least one machine readable storage medium of any of Examples 17 to 22, wherein the one or more modulation schemes includes one or more binary phase shift keying (BPSK) or quaternary binary phase shift keying (QBPSK).

Example 24 includes a Next Generation NodeB (gNB) operable to encode synchronization signals for transmission to a user equipment (UE). The gNB can comprise: means for generating, at the gNB, a binary sequence; means for modulating, at the gNB, the binary sequence using one or more modulation schemes to form a modulated binary sequence; means for performing, at the gNB, one of an extension or truncation operation on the modulated binary sequence to obtain a modulated binary sequence that is equal to a discrete Fourier transform (DFT) length of N, wherein N is a power of two integer; means for performing, at the gNB, a DFT operation to map the modulated binary sequence equal of DFT length N to N subcarriers in a frequency domain; means for performing, at the gNB, an inverse DFT operation to the modulated binary sequence equal to DFT length N that is mapped to the N subcarriers in the frequency domain to obtain synchronization signal (SS) orthogonal frequency division multiplexing (OFDM) symbols in a time domain; and means for encoding, at the gNB, the SS OFDM symbols for transmission to the UE.

Example 25 includes the gNB of Example 24, wherein the SS OFDM symbols form a primary synchronization signal.

Example 26 includes the gNB of any of Examples 24 to 25, further comprising: means for performing a multiplication operation to the modulated binary sequence prior to the DFT operation, wherein the multiplication operation involves multiplying the modulated binary sequence with an alternating sequence of $\{+1, +j\}$ that is mapped to even or odd subcarriers in the frequency domain.

Example 27 includes the gNB of any of Examples 24 to 26, further comprising: means for generating the binary sequence based on an m-sequence that is generated using a primitive polynomial.

Example 28 includes the gNB of any of Examples 24 to 27, further comprising: means for generating the binary sequence based on a maximum run length sequence (m-sequence) that is generated using a primitive polynomial.

Example 29 includes the gNB of any of Examples 24 to 28, further comprising: means for inserting a cyclic prefix prior to the SS OFDM symbols in the time domain.

Example 30 includes the gNB of any of Examples 24 to 29, wherein the one or more modulation schemes includes one or more binary phase shift keying (BPSK) or quaternary binary phase shift keying (QBPSK).

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology.

What is claimed is:

1. A base station operable to encode synchronization signals for transmission to a user equipment (UE), the base station comprising:
   one or more processors configured to:
      generate, at the base station, a binary sequence;
      modulate, at the base station, the binary sequence using one or more modulation schemes to form a modulated binary sequence;
      perform, at the base station, one of an extension or truncation operation on the modulated binary sequence to obtain a modulated binary sequence that is equal to a discrete Fourier transform (DFT) length of N, wherein N is an integer;
      perform a multiplication operation to the modulated binary sequence, wherein the multiplication operation involves multiplying the modulated binary sequence with an alternating sequence of $\{+1, +j\}$ that is mapped to even or odd subcarriers in the frequency domain;
      perform, at the base station, a DFT operation to map the modulated binary sequence equal of DFT length N to N subcarriers in a frequency domain;
      perform, at the base station, an inverse DFT operation to the modulated binary sequence equal to DFT length N that is mapped to the N subcarriers in the frequency domain to obtain synchronization signal (SS) orthogonal frequency division multiplexing (OFDM) symbols in a time domain; and
      encode, at the base station, the SS OFDM symbols for transmission to the UE; and
   a memory interface configured to retrieve from a memory the SS OFDM symbols.

2. The base station of claim 1, further comprising a transceiver configured to transmit the SS OFDM symbols to the UE.

3. The base station of claim 1, wherein the SS OFDM symbols form a primary synchronization signal.

4. The base station of claim 1, wherein the one more processors are configured to generate the binary sequence based on an m-sequence that is generated using a primitive polynomial.

5. The base station of claim 1, wherein the one more processors are configured to generate the binary sequence based on a maximum run length sequence (m-sequence) that is generated using a primitive polynomial.

6. The base station of claim 1, wherein the one more processors are configured to insert a cyclic prefix prior to the SS OFDM symbols in the time domain.

7. The base station of claim 1, wherein the one or more modulation schemes includes one or more binary phase shift keying (BPSK) or quaternary binary phase shift keying (QBPSK).

8. The base station of claim 1, wherein N is a power of two integer.

9. The base station of claim 1, wherein the binary sequence has a length of 63, 127 or 255 samples.

10. The base station of claim 1, wherein the binary sequence has an extended length of 64, 128 or 256 samples.

11. A method to encode synchronization signals for transmission to a user equipment (UE), the method comprising:
   generating a binary sequence;
   modulating the binary sequence using one or more modulation schemes to form a modulated binary sequence;
   performing one of an extension or truncation operation on the modulated binary sequence to obtain a modulated binary sequence that is equal to a discrete Fourier transform (DFT) length of N, wherein N is an integer;
   performing a multiplication operation to the modulated binary sequence, wherein the multiplication operation involves multiplying the modulated binary sequence with an alternating sequence of $\{+1, +j\}$ that is mapped to even or odd subcarriers in the frequency domain;
   performing a DFT operation to map the modulated binary sequence equal of DFT length N to N subcarriers in a frequency domain;
   performing an inverse DFT operation to the modulated binary sequence equal to DFT length N that is mapped to the N subcarriers in the frequency domain to obtain synchronization signal (SS) orthogonal frequency division multiplexing (OFDM) symbols in a time domain; and
   encoding the SS OFDM symbols for transmission to the UE.

12. The method of claim 11, further comprising transmitting the SS OFDM symbols to the UE.

13. The method of claim 11, wherein the SS OFDM symbols form a primary synchronization signal.

14. The method of claim 11, further comprising generating the binary sequence based on an m-sequence that is generated using a primitive polynomial.

15. The method of claim 11, further comprising generating the binary sequence based on a maximum run length sequence (m-sequence) that is generated using a primitive polynomial.

16. The method of claim 11, further comprising inserting a cyclic prefix prior to the SS OFDM symbols in the time domain.

17. The method of claim 11, wherein the one or more modulation schemes includes one or more binary phase shift keying (BPSK) or quaternary binary phase shift keying (QBPSK).

18. The method of claim 11, wherein N is a power of two integer.

* * * * *